US012511797B2

(12) United States Patent
Zeng et al.

(10) Patent No.: US 12,511,797 B2
(45) Date of Patent: Dec. 30, 2025

(54) SEMANTIC IMAGE SYNTHESIS

(71) Applicant: ADOBE INC., San Jose, CA (US)

(72) Inventors: Yu Zeng, Baltimore, MD (US); Zhe Lin, Clyde Hill, WA (US); Jianming Zhang, Fremont, CA (US); Qing Liu, Santa Clara, CA (US); Jason Wen Yong Kuen, San Jose, CA (US); John Philip Collomosse, Woking (GB)

(73) Assignee: ADOBE INC., San Jose, CA (US)

( * ) Notice: Subject to any disclaimer, the term of this patent is extended or adjusted under 35 U.S.C. 154(b) by 214 days.

(21) Appl. No.: 18/463,333

(22) Filed: Sep. 8, 2023

(65) Prior Publication Data

US 2025/0086849 A1 Mar. 13, 2025

(51) Int. Cl.
*G06V 10/70* (2022.01)
*G06F 40/295* (2020.01)
*G06F 40/30* (2020.01)
*G06T 11/00* (2006.01)
*G06V 10/774* (2022.01)
(Continued)

(52) U.S. Cl.
CPC ............ *G06T 11/00* (2013.01); *G06F 40/295* (2020.01); *G06F 40/30* (2020.01); *G06V 10/774* (2022.01); *G06V 10/776* (2022.01); *G06V 20/70* (2022.01); *G06T 2200/24* (2013.01)

(58) Field of Classification Search
CPC ... G06T 11/00; G06T 2200/24; G06F 40/295; G06F 40/30; G06V 20/70; G06V 10/774
See application file for complete search history.

(56) References Cited

U.S. PATENT DOCUMENTS 8,233,726 B1 * 7/2012 Popat ................. G06V 30/2445
382/187
8,761,512 B1 * 6/2014 Buddemeier ..... G06F 18/24323
382/181
(Continued)

FOREIGN PATENT DOCUMENTS

DE   102023124222 A1 * 5/2024 ............... G06N 3/08
WO   WO-2023225344 A1 * 11/2023 .......... G06F 40/284
WO   WO-2024248737 A1 * 12/2024 ............. G06T 15/04

OTHER PUBLICATIONS

1Zeng, et al., "SceneComposer: Any-Level Semantic Image Synthesis", n Proceedings of the IEEE/CVF Conference on Computer Vision and Pattern Recognition, 2023, pp. 22468-22478.
(Continued)

*Primary Examiner* — Cheng Yuan Tseng
(74) *Attorney, Agent, or Firm* — F. CHAU & ASSOCIATES, LLC

(57) ABSTRACT

Embodiments of the present disclosure include obtaining a text prompt describing an element, layout information indicating a target region for the element, and a precision level corresponding to the element. Some embodiments generate a text feature pyramid based on the text prompt, the layout information, and the precision level, wherein the text feature pyramid comprises a plurality of text feature maps at a plurality of scales, respectively. Then, an image is generated based on the text feature pyramid. In some cases, the image includes an object corresponding to the element of the text prompt at the target region. Additionally, a shape of the object corresponds to a shape of the target region based on the precision level.

18 Claims, 22 Drawing Sheets

(51) Int. Cl.
*G06V 10/776* (2022.01)
*G06V 20/70* (2022.01)

(56) References Cited

U.S. PATENT DOCUMENTS

| | | | | |
|---|---|---|---|---|
| 10,121,086 | B2* | 11/2018 | Suzuki | H04N 23/631 |
| 11,599,972 | B1* | 3/2023 | Xu | G06N 3/045 |
| 11,741,688 | B2* | 8/2023 | Xu | G06F 18/24 |
| 12,197,496 | B1* | 1/2025 | Chakrabarty | G06F 16/538 |
| 2023/0222150 | A1* | 7/2023 | Sun | G06F 16/9024 707/740 |
| 2023/0368337 | A1* | 11/2023 | Karras | G06N 3/044 |
| 2024/0070816 | A1* | 2/2024 | Jandial | G06V 10/774 |
| 2024/0071116 | A1* | 2/2024 | Momo | G06V 30/19093 |
| 2024/0153259 | A1* | 5/2024 | Motiian | G06V 10/751 |
| 2024/0161327 | A1* | 5/2024 | Chen | G06T 3/40 |
| 2024/0161403 | A1* | 5/2024 | Lin | G06T 3/40 |
| 2024/0161462 | A1* | 5/2024 | Gandelsman | G06T 5/60 |
| 2024/0161468 | A1* | 5/2024 | Li | G06V 10/82 |
| 2024/0169604 | A1* | 5/2024 | Gandelsman | G06T 11/20 |
| 2024/0169622 | A1* | 5/2024 | Xie | G06T 11/00 |
| 2024/0169623 | A1* | 5/2024 | Zeng | G06T 11/60 |
| 2024/0169701 | A1* | 5/2024 | Kulal | G06T 7/70 |
| 2024/0242452 | A1* | 7/2024 | Zhi | G06N 3/094 |
| 2024/0256831 | A1* | 8/2024 | Li | G06N 3/045 |
| 2024/0264718 | A1* | 8/2024 | Benedetto | G06N 3/047 |
| 2024/0265065 | A1* | 8/2024 | Lackey | G06Q 10/10 |
| 2024/0265505 | A1* | 8/2024 | Ham | G06T 5/70 |
| 2024/0282016 | A1* | 8/2024 | Liu | G06Q 50/01 |
| 2024/0297957 | A1* | 9/2024 | Bakunov | G06V 10/945 |
| 2024/0303873 | A1* | 9/2024 | Wallace | G06T 5/70 |
| 2024/0338859 | A1* | 10/2024 | Marri | G06V 10/74 |
| 2024/0346629 | A1* | 10/2024 | Harikumar | G06T 5/73 |
| 2024/0355019 | A1* | 10/2024 | Assouline | G06V 40/161 |
| 2024/0362265 | A1* | 10/2024 | He | G06N 3/08 |
| 2024/0404144 | A1* | 12/2024 | Aggarwal | G06N 3/045 |
| 2024/0404145 | A1* | 12/2024 | Liu | G06V 10/82 |
| 2024/0420205 | A1* | 12/2024 | Unnikrishnan | G06Q 30/0625 |
| 2024/0428481 | A1* | 12/2024 | Rami Koujan | G06F 40/279 |
| 2025/0022100 | A1* | 1/2025 | Wu | G06T 5/50 |
| 2025/0046055 | A1* | 2/2025 | Zhang | G06V 10/60 |
| 2025/0061548 | A1* | 2/2025 | Liu | G06T 5/60 |
| 2025/0061583 | A1* | 2/2025 | Clever | G06V 10/774 |
| 2025/0061610 | A1* | 2/2025 | Jindal | G06V 10/82 |
| 2025/0078341 | A1* | 3/2025 | Phogat | G06T 11/60 |
| 2025/0252537 | A1* | 8/2025 | Assael | G06N 3/0464 |

OTHER PUBLICATIONS

2Stability.AI, "Stable Diffusion Public Release", found on the Internet, https://stability.ai/blog/stable-diffusion-public-release, Dated: Aug. 2022, 6 pages.

3Gafni, et al., "Make-A-Scene: Scene-Based Text-to-Image Generation with Human Priors", arXiv preprint arXiv:2203.13131v1 [cs.CV] Mar. 24, 2022, 17 pages.

4Isola, et al., "Image-to-Image Translation with Conditional Adversarial Networks", In IEEE Conference on Computer Vision and Pattern Recognition, pp. 1125-1134, 2017.

5Nichol, et al., "Glide: Towards Photorealistic Image Generation and Editing with Text-Guided Diffusion Models", arXiv preprint arXiv:2112.10741v3 [cs.CV] Mar. 8, 2022, 20 pages.

6Park, et al., "Semantic Image Synthesis with Spatially-Adaptive Normalization", In IEEE Conference on Computer Vision and Pattern Recognition, 2019, pp. 2337-2346.

7Ramesh, et al., "Hierarchical Text-Conditional Image Generation with Clip Latents", arXiv preprint arXiv:2204.06125v1 [cs.CV] Apr. 13, 2022, 27 pages.

8Reed, et al., "Generative Adversarial Text to Image Synthesis", In International Conference on Machine Learning, pp. 1060-1069, PMLR, 2016.

9Rombach, et al., "High-Resolution Image Synthesis with Latent Diffusion Models", In IEEE Conference on Computer Vision and Pattern Recognition, 2022, pp. 10684-10695.

10Saharia, et al., "Photorealistic Text-to-Image Diffusion Models with Deep Language Understanding", 36th Conference on Neural Information Processing Systems (NeurIPS 2022), 16 pages.

11Sylvain, et al., "Object-Centric Image Generation from Layouts", In the Thirty-Fifth AAAI Conference on Artificial Intelligence (AAAI-21), 2021, pp. 2647-2655.

12Zhu, et al., "SEAN: Image Synthesis with Semantic Region-Adaptive Normalization", In IEEE Conference on Computer Vision and Pattern Recognition, 2020, pp. 5104-5113.

* cited by examiner

Pass Feature Maps to the Diffusion Model

Multi-Scale Guided Diffusion

SEMANTIC IMAGE SYNTHESIS

BACKGROUND

The following relates generally to machine learning, and more specifically to machine learning for image generation. Digital image processing refers to the use of a computer to edit a digital image using an algorithm or a processing network. In some cases, image processing software can be used for various image processing tasks, such as image editing, image restoration, image generation, etc. Some image processing systems may implement machine learning techniques, for example, to perform tasks using predictive models (e.g., without explicitly programming the system for each task), to perform tasks with more accuracy or in less time, to perform tasks using special-purpose hardware, etc.

Image generation (a subfield of digital image processing) includes the use of a machine learning model to generate images. Diffusion-based models are one category of machine learning models that are used to generate images. Specifically, diffusion models can be trained to take random noise as input and generate new images with features similar to the training data. In some examples, diffusion models can be used to generate unseen images or inpainted images (i.e., filling missing regions or masked areas).

SUMMARY

The present disclosure describes systems and methods for image generation. Embodiments of the disclosure include an image processing apparatus configured to receive user commands via a user interface and generate a synthesized image using a multi-scale guided diffusion model. The image processing apparatus, via the user interface, obtains a text prompt, layout information indicating a target region for an element, and a precision level corresponding to the element. In some examples, layout information relates to a semantic label or a virtual brush drawn on a canvas indicating the target region. In some cases, different text prompts and layout information corresponding to a set of objects are specified on an image canvas via the user interface. A precision level is specified and associated with a respective element or entity. In some embodiments, the image processing apparatus generates a set of masks for the element at a set of resolutions, respectively, and a relationship between the target region and each of the set of masks is based on a user-specified precision level. Accordingly, in the synthesized image from the diffusion model, a shape of the object corresponds to a shape of the target region based on the precision level.

A method, apparatus, and non-transitory computer readable medium for image processing are described. One or more embodiments of the method, apparatus, and non-transitory computer readable medium include obtaining a text prompt describing an element, layout information indicating a target region for the element, and a precision level corresponding to the element; generating a text feature pyramid based on the text prompt, the layout information, and the precision level, wherein the text feature pyramid comprises a plurality of text feature maps at a plurality of scales, respectively; and generating an image based on the text feature pyramid using a diffusion model, wherein the image includes an object corresponding to the element of the text prompt at the target region, wherein a shape of the object corresponds to a shape of the target region based on the precision level.

A method, apparatus, and non-transitory computer readable medium for image processing are described. One or more embodiments of the method, apparatus, and non-transitory computer readable medium include initializing a diffusion model; obtaining training data including a plurality of training pairs, wherein each of the plurality of training pairs includes a training image and a text feature pyramid, and wherein the text feature pyramid comprises a plurality of text feature maps at a plurality of scales based on a precision level corresponding to an object in the training image; and training the diffusion model to generate images including one or more objects at respective target regions based on a user-specified precision level using the training data.

An apparatus and method for image processing are described. One or more embodiments of the apparatus and method include at least one processor; at least one memory including instructions executable by the at least one processor; and a diffusion model comprising parameters stored in the at least one memory, wherein the diffusion model is trained to generate an image based on a text feature pyramid, wherein the image includes an object corresponding to an element of a text prompt at a target region, and wherein a shape of the object corresponds to a shape of the target region based on a user-specified precision level.

DETAILED DESCRIPTION

Figure 1:
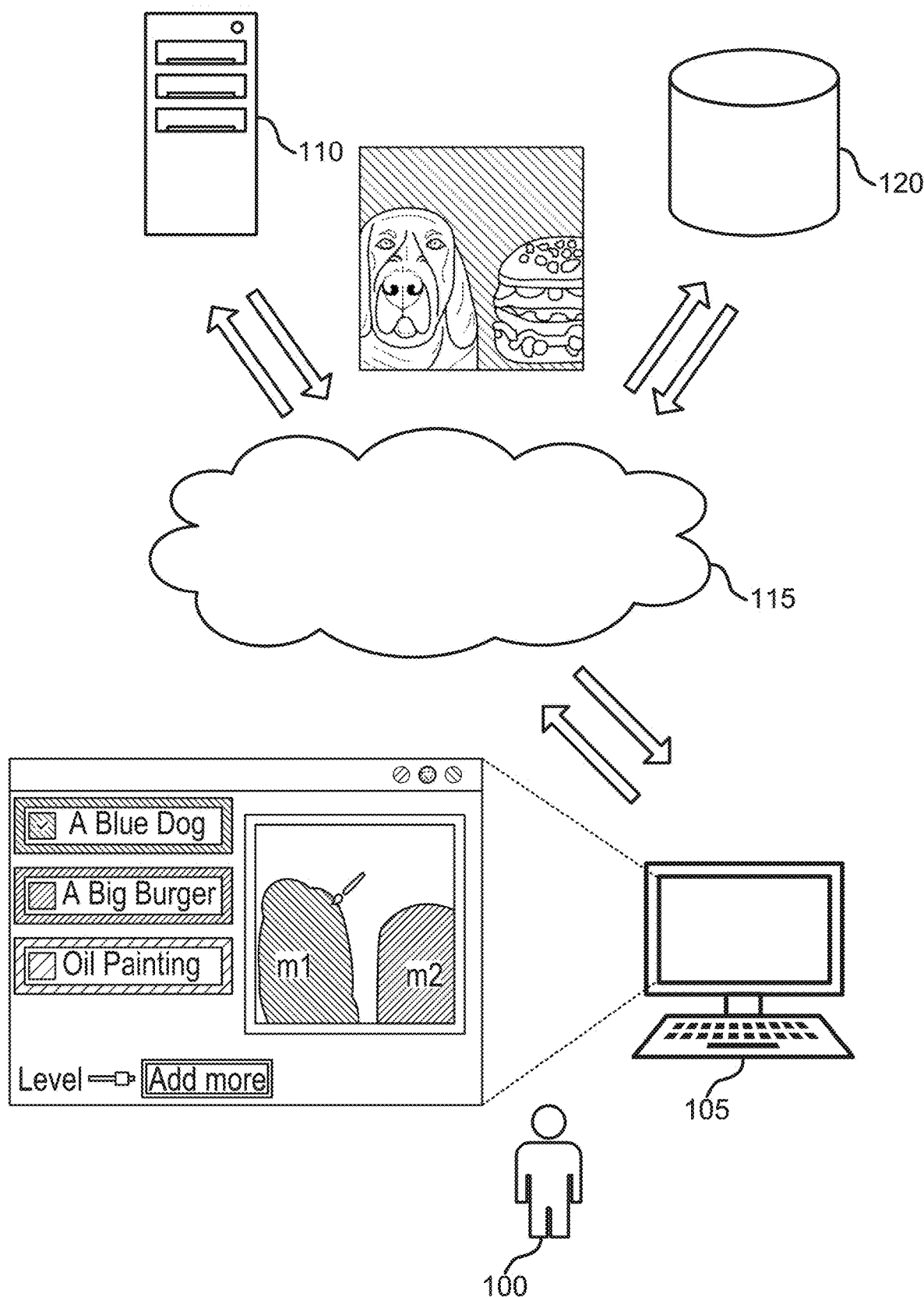
FIG. 1 shows an example of an image processing system according to aspects of the present disclosure.

The present disclosure describes systems and methods for image generation. Embodiments of the disclosure include an image processing apparatus configured to receive user commands via a user interface and generate a synthesized image using a multi-scale guided diffusion model. The image processing apparatus, via the user interface, obtains a text prompt, layout information indicating a target region for an element, and a precision level corresponding to the element. In some examples, layout information relates to a semantic label or a virtual brush drawn on a canvas indicating the target region. In some cases, different text prompts and layout information corresponding to a set of objects are specified on an image canvas via the user interface. A precision level is specified and associated with a respective element or entity. In some embodiments, the image processing apparatus generates a set of masks for the element at a set of resolutions, respectively, and a relationship between the target region and each of the set of masks is based on a user-specified precision level. Accordingly, in the synthesized image from the diffusion model, a shape of the object corresponds to a shape of the target region based on the precision level.

Diffusion models are a class of generative neural networks that can be trained to generate new data with features similar to features found in training data. Diffusion models can be used in image translation, image synthesis, and image completion tasks (e.g., image inpainting). Conventional models have not enabled a user interface (e.g., via a virtual brush) to that take intermediate-level layouts with coarse shapes. For instance, diffusion models may generate unwanted results that are not faithful to the text input and object relations. Additionally, these models fail to control the layout of objects (e.g., location, size, or orientation) with sufficient precision in the generated images and thus lack controllability.

Embodiments of the present disclosure include an image processing apparatus receives, via a user interface, text prompts, layouts (e.g., layout information indicating target regions and relations among objects), and precision levels (for precision control) corresponding to a set of elements mentioned in the text prompts. In some examples, the image processing apparatus combines text, layout information, and precision levels for image synthesis. In some examples, a virtual brush (e.g., semantic labels) is used to draw out layout information indicating a target region for the element.

In some embodiments, a mask pyramid component of the image processing apparatus generates a precision-encoded mask pyramid to model layout precision. The mask pyramid component relates shape precision to a set of levels in a pyramid representation and encodes precision information by dropping out regions of lower precision levels. For example, the l-th level of the mask pyramid is a sub-layout (subset of regions) comprising semantic regions with a precision level no less than l. By generating a text feature map for each sub-layout, a feature pyramid component of the image processing apparatus generates a text feature pyramid as a unified representation of semantics, composition, and precision. Additionally, the text feature pyramid is input to a multi-scale guided diffusion model to generate a synthesized image. Accordingly, the image processing apparatus has precise control over the layout of the set of objects in the synthesized image.

Embodiments of the present disclosure involve generating a precision-encoded mask pyramid that enables any-level semantic image synthesis by modeling layout precision. The image processing apparatus, via a mask pyramid component, models shape precision to levels in a pyramid representation and encodes precision levels by dropping out certain regions of lower precision levels. For example, the L-th level of the mask pyramid is a sub-layout (subset of regions) consisting of semantic regions with precision level no less than L. The image processing apparatus constructs a precision-encoded mask pyramid based on user-specified precision levels corresponding to respective element and generates a text feature pyramid comprising a set of feature maps.

Embodiments of the present disclosure relate to layout controlling with sufficient precision in the context of text-to-image or segmentation-to-image generation. With a lower precision level, the shape of the generated objects may deviate more from the layout; with a higher precision level, they follow the layout more strictly. Conventional models are limited to controlling only the layout in the context of text-to-image generation, e.g., they fail to cover shape precision in their layout control. It is unknown how precisely the generated objects should follow the input layout. By contrast, the image processing apparatus based on the present disclosure enables users to choose the precision levels and generate an image including objects that are positioned closely in accord with the precision levels.

Embodiments of the present disclosure can be used in the context of image generation applications. For example, an image processing apparatus based on the present disclosure receives user input via the user interface including text input, layout input, and precision level input, and generates a realistic image based on the user input. An example application in the image generation context is provided with reference to FIGS. 2-5. Details regarding the architecture of an example image processing system are provided with reference to FIGS. 1 and 7-14. Details regarding the process of image processing are provided with reference to FIGS. 6 and 14-18. Example training processes are described with reference to FIGS. 19-21.

Accordingly, by enabling the user to specify layout information and precision levels to a multi-scale guided diffusion model, embodiments of the present disclosure enable users to generate images that more accurately reflect a desired layout with precision control compared to conventional image generation models. Embodiments of the present disclosure are flexible in supporting various precision levels (e.g., from low to intermediate to high) and assist users of different drawing expertise and at different stages of creative workflow. Output images from the improved image processing apparatus have increased quality and follow layout at a given precision level. The unconventional steps of constructing a precision-encoded mask pyramid and a subsequent feature map pyramid representation to jointly encode precision level, semantics, and composition information (e.g., layout information), embodiments of the present disclosure increase controllability in image synthesis using diffusion models.

Additionally, the present disclosure reduces the time it takes for users to generate the desired output (avoid post-editing to obtain a desired precision), as well as guides the model to produce more relevant output. Embodiments give users fine control over the shape, orientation, and locations of objects in images generated by the diffusion model, while still producing multiple versions of an image based on random inputs.

Image Generation

In FIGS. 1-6, a method, apparatus, and non-transitory computer readable medium for image processing are described. One or more embodiments of the method, apparatus, and non-transitory computer readable medium include obtaining a text prompt describing an element, layout information indicating a target region for the element, and a precision level corresponding to the element; generating a text feature pyramid based on the text prompt, the layout information, and the precision level, wherein the text feature pyramid comprises a plurality of text feature maps at a plurality of scales, respectively; and generating an image based on the text feature pyramid using a diffusion model, wherein the image includes an object corresponding to the element of the text prompt at the target region, wherein a shape of the object corresponds to a shape of the target region based on the precision level.

Some examples of the method, apparatus, and non-transitory computer readable medium further include encoding the text prompt to obtain text features representing the element of the text prompt, wherein the text feature pyramid includes the text features.

Some examples of the method, apparatus, and non-transitory computer readable medium further include applying the text features to a text feature map of the plurality of text feature maps based on a corresponding mask of a plurality of masks.

Some examples of the method, apparatus, and non-transitory computer readable medium further include generating a plurality of masks for the element at a plurality of resolutions, respectively, wherein a relationship between the target region and each of the plurality of masks is based on the precision level.

Some examples of the method, apparatus, and non-transitory computer readable medium further include determining that a mask index is less than or equal to the precision level. Some examples further include generating a non-zero mask of the plurality of masks corresponding to the target region based on the determination.

Some examples of the method, apparatus, and non-transitory computer readable medium further include generating an initial mask corresponding to the target region. Some examples further include resizing the initial mask to obtain the plurality of masks at the plurality of resolutions.

Some examples of the method, apparatus, and non-transitory computer readable medium further include identifying an additional element in the text prompt, wherein the text feature pyramid includes text features corresponding to the element and additional text features corresponding to the additional element.

Some examples of the method, apparatus, and non-transitory computer readable medium further include identifying an additional region corresponding to the additional element. Some examples further include generating a first plurality of masks corresponding to the target region and a second plurality of masks corresponding to the additional region, wherein the text feature pyramid is generated based on the first plurality of masks and the second plurality of masks.

Some examples of the method, apparatus, and non-transitory computer readable medium further include providing the plurality of text feature maps to a plurality of layers of the diffusion model based on the plurality of scales, respectively.

Some examples of the method, apparatus, and non-transitory computer readable medium further include displaying a user interface, wherein the user interface includes a text input field for the text prompt and a selection tool for selecting the target region.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 7.

In an example shown in FIG. 1, a text prompt describing an element, layout information indicating a target region for the element, and a precision level corresponding to the element are input and transmitted to image processing apparatus 110, e.g., via user device 105 and cloud 115. In some examples, user 100, via a user interface, provides a text prompt "a blue dog" and a precision level corresponding to the element (e.g., "a blue dog"). User 100 draws a target region on an image canvas for the element (e.g., "a blue dog") using a semantic brush. User 100, via the user interface, provides an additional text prompt "a big burger" and a precision level corresponding the additional element (e.g., "a big burger"). User 100 draws an additional target region on the image canvas for the additional element (e.g., "a big burger") using an additional semantic brush.

Image processing apparatus 110 generates a text feature pyramid based on the text prompt, the layout information, and the precision level. The text feature pyramid comprises a set of text feature maps at a set of scales, respectively. A diffusion model of the image processing apparatus 110 generates an output image based on the text feature pyramid, where the image includes an object corresponding to the element of the text prompt at the target region. A shape of the object corresponds to a shape of the target region based on the precision level. As the example shown in FIG. 1, the output image includes a blue dog object positioned in the target region of the image. The output image also includes a big burger object positioned in the additional target region of the image.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application for tasks such as text-to-image generation, segmentation to image generation, etc.). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image processing apparatus 110 obtains a text prompt describing an element, layout information indicating a target region for the element, and a precision level corresponding to the element; generates a text feature pyramid based on the text prompt, the layout information, and the precision level, wherein the text feature pyramid comprises a plurality of text feature maps at a plurality of scales, respectively; and generates an image based on the text feature pyramid using a diffusion model, wherein the image includes an object corresponding to the element of the text prompt at the target region, wherein a shape of the object corresponds to a shape of the target region based on the precision level. The image processing apparatus 110 returns the synthesized image to user 100. The process of using the image processing apparatus 110 is further described with reference to FIG. 2.

Image processing apparatus 110 includes a computer implemented network comprising a user interface, a named entity recognition component, a text encoder, a mask pyramid component, a feature pyramid component, and a diffusion model. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIGS. 7-13. Further detail regarding the operation of image processing apparatus 110 is provided with reference to FIGS. 2, 6, and 14-18.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
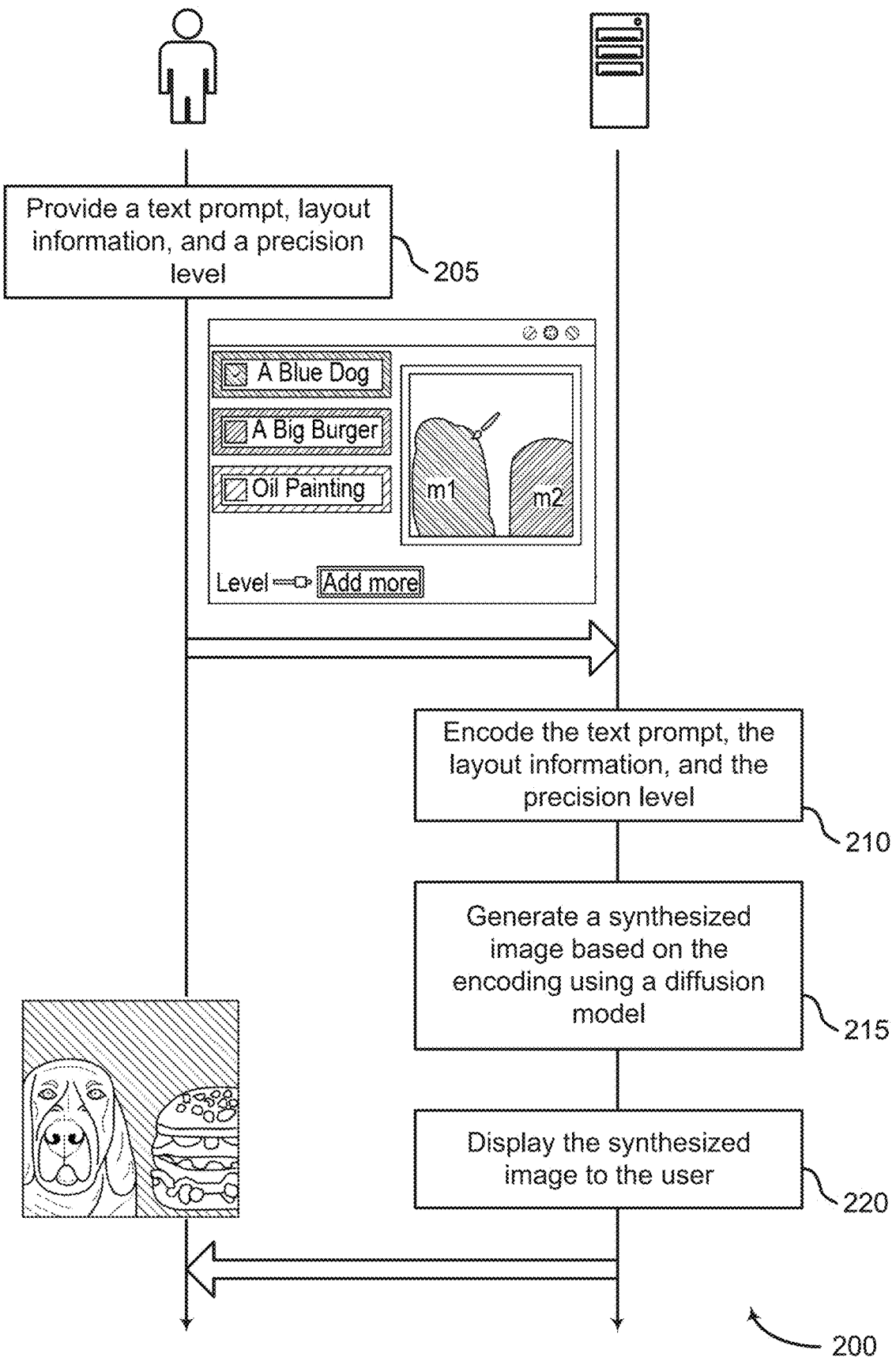
FIG. 2 shows an example of an image generation application according to aspects of the present disclosure.

FIG. 2 shows an example of an image generation application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a text prompt, layout information, and a precision level. In some cases, the operations of this step refer to, or may be performed by, a user as described with reference to FIG. 1. As an example shown in FIG. 2, a first text prompt is "a blue dog". A second text prompt is "a big burger". A third text prompt is "oil painting". Precision level is input via precision level control element 1130 with reference to FIG. 11 on the user interface.

At operation 210, the system encodes the text prompt, the layout information, and the precision level. In some cases, the operations of this step refer to, or may be performed by, an image processing apparatus as described with reference to FIGS. 1 and 7.

At operation 215, the system generates a synthesized image based on the encoding using a diffusion model. In some cases, the operations of this step refer to, or may be performed by, an image processing apparatus as described with reference to FIGS. 1 and 7.

At operation 220, the system displays the synthesized image to the user. In some cases, the operations of this step refer to, or may be performed by, an image processing apparatus as described with reference to FIGS. 1 and 7. In the above example, the synthesized image includes a "blue dog" object corresponding to the element of the text prompt at the target region. A shape of the "blue dog" object corresponds to a shape of the target region based on the respective precision level. The synthesized image also includes a "big burger" object corresponding to the element of the text prompt at the additional target region. A shape of the "big burger" object corresponds to a shape of the additional target region based on the respective precision level.

Figure 3:
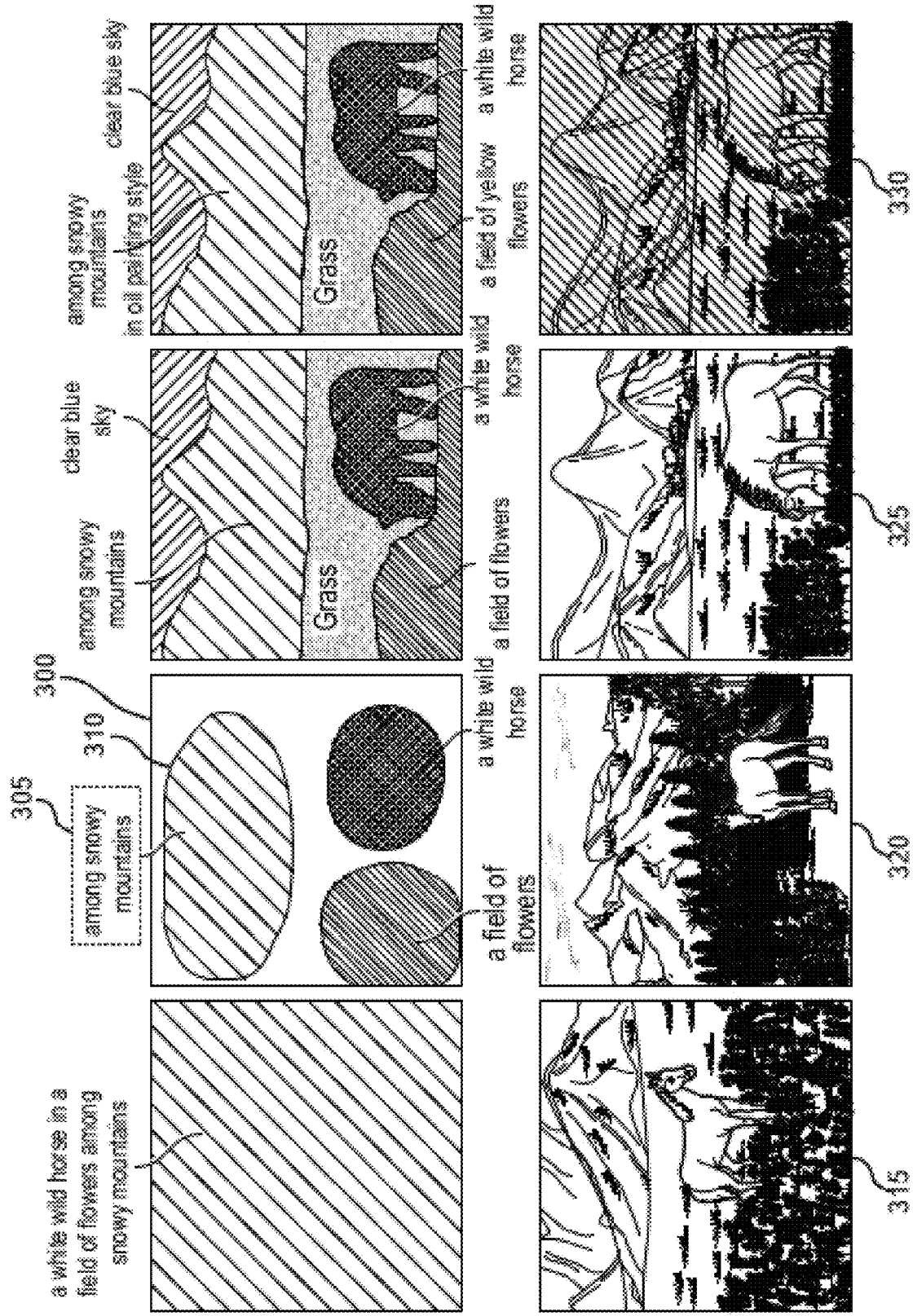
FIG. 3 shows an example of synthesized images based on text prompt and layout information according to aspects of the present disclosure.

FIG. 3 shows an example of synthesized images based on text prompt 305 and layout information according to aspects of the present disclosure. The example shown includes user interface 300, text prompt 305, target region 310, first output image 315, second output image 320, third output image 325, and fourth output image 330.

According to some embodiments, user interface 300 obtains a text prompt 305 describing an element, layout information indicating a target region 310 for the element, and a precision level corresponding to the element. In some examples, user interface 300 includes a text input field for the text prompt 305 and a selection tool for selecting the target region 310.

According to some embodiments, user interface 300 is configured to identify the text prompt 305 describing the element, layout information indicating the target region 310 for the element of the text prompt 305, and the user-specified precision level corresponding to the element. User interface 300 is an example of, or includes aspects of, the corresponding element described with reference to FIGS. 4, 7, 10, and 11.

FIG. 3 shows examples of image synthesis from any-level semantic layouts. The leftmost image includes the coarsest layout, i.e., at the 0-th precision level, which is equivalent to a text input. For example, the text input is "a white wild horse in a field of flowers among snowy mountains". The third image (on the top row, third image from the left) includes the finest layout, i.e., at the highest level, is close to an accurate segmentation map. The second image (on the top row, second from the left) includes intermediate level layouts. The image from left to right shows from coarse layout to fine layout. Additionally, the shape control becomes tighter with increasing layout precision levels. In the rightmost image, users specify different precision levels for different components, e.g., to include a 0-th level style indicator while the remaining regions are of higher levels.

In some examples, user interface 300 obtains a text prompt 305 describing an element. Text prompt 305 is "among snowy mountains". User interface 300 obtains layout information indicating a target region 310 for the element (i.e., "among snowy mountains"), and a precision level corresponding to the element. Target region 310 for the element "snowy mountains" is located on the top portion slightly towards the left on the image canvas. The image processing apparatus generates second output image 320 based on text prompt 305 and layout information indicating target region 310 for the element. In some examples, the image processing apparatus generates first output image 315, second output image 320, third output image 325, and fourth output image 330 based on corresponding text prompt(s) and layout information indicating respective target region(s) for element(s).

In some examples, first output image 315, second output image 320, third output image 325, and fourth output image 330 are generated using unified conditional image synthesis model that generates images from a semantic layout at user-specified precision levels. In some cases, users first start from an idea, which can be expressed as a text prompt or a set of concepts (on the top row, first image from the left). Then users draw the approximate outlines and refine each object (on the top row, second image and third image).

In some embodiments, the image processing apparatus models a semantic layout as a set of semantic regions with free-form text descriptions. The layout can be sparse and each region is associated or is assigned a precision level to control how well the generated object should fit to the specified shape. The image processing apparatus incorporates text-to-image generation when the layout is the coarsest. Additionally or alternatively, the image processing apparatus incorporates segmentation-to-image generation when the layout is a segmentation map. By adjusting the precision level, users can achieve their desired controllability.

Text prompt 305 is an example of, or includes aspects of, the corresponding element described with reference to FIGS. 4 and 11. Target region 310 is an example of, or includes aspects of, the corresponding element described with reference to FIGS. 4 and 11. First output image 315 is an example of, or includes aspects of, the corresponding element described with reference to FIG. 4. Second output image 320 is an example of, or includes aspects of, the corresponding element described with reference to FIG. 4. Third output image 325 is an example of, or includes aspects of, the corresponding element described with reference to FIG. 4. Fourth output image 330 is an example of, or includes aspects of, the corresponding element described with reference to FIG. 4.

Figure 4:
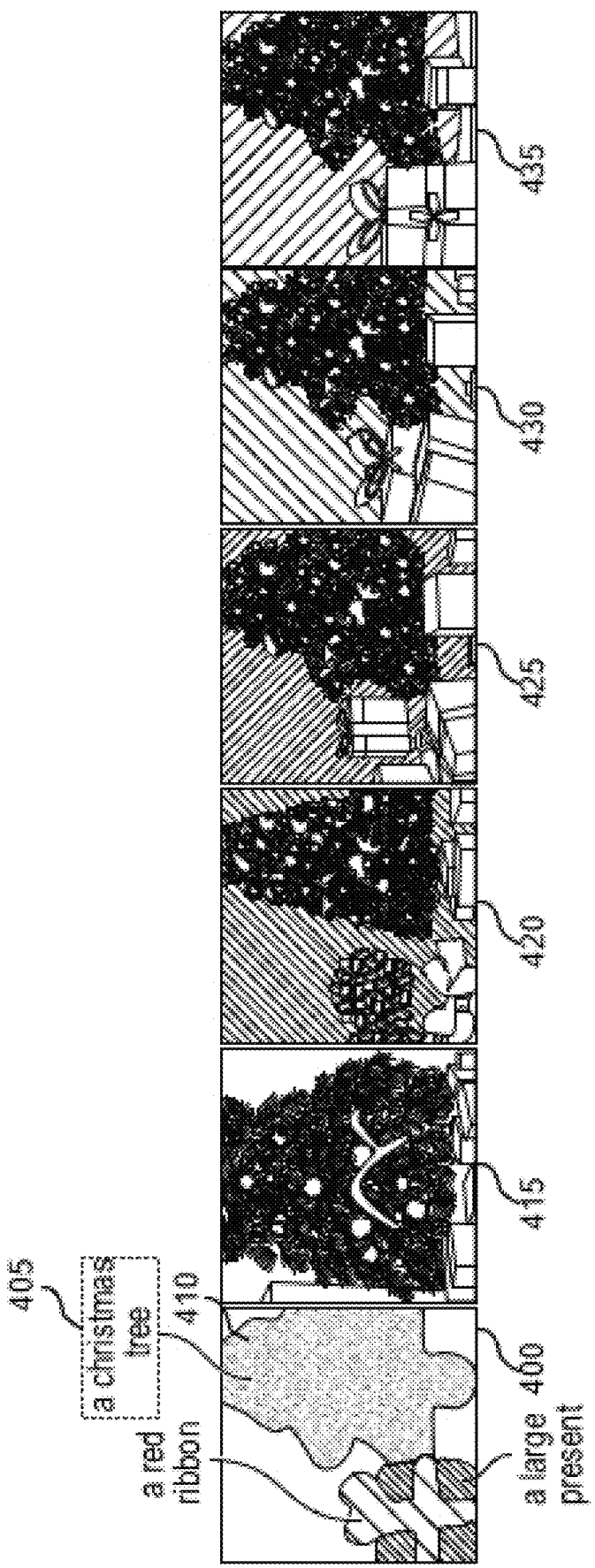
FIG. 4 shows an example of synthesized images at different precision levels according to aspects of the present disclosure.

FIG. 4 shows an example of synthesized images at different precision levels according to aspects of the present disclosure. The example shown includes user interface 400, text prompt 405, target region 410, first output image 415, second output image 420, third output image 425, fourth output image 430, and fifth output image 435.

User interface 400 is an example of, or includes aspects of, the corresponding element described with reference to FIGS. 3, 7, 10, and 11. Text prompt 405 is an example of, or includes aspects of, the corresponding element described with reference to FIGS. 3 and 11. Target region 410 is an example of, or includes aspects of, the corresponding element described with reference to FIGS. 3 and 11.

FIG. 4 shows example output images having different precision levels. For each input layout, the image processing apparatus samples the images starting from a same noise, so the images at different precision levels have similar styles. For example, user interface 400 obtains text prompt 405 describing an element. Text prompt 405 is "a Christmas tree". User interface 400 also obtains layout information indicating a target region 410 for the element (i.e., "a Christmas tree"). Target region 410 for the element is located on the right-hand portion of the image canvas. The image processing apparatus generates first output image 415 based on text prompt 405, layout information indicating target region 410 for the element, and a precision level corresponding to the element. In some cases, user-specified precision level is input to the image processing apparatus via user interface 400.

In some examples, the image processing apparatus generates second output image 420, third output image 425, fourth output image 430, and fifth output image 435 based on corresponding text prompt(s), layout information indicating respective target region(s) for element(s), and a user-specified precision level corresponding to the element(s).

First output image 415 is an example of, or includes aspects of, the corresponding element described with reference to FIG. 3. Second output image 420 is an example of, or includes aspects of, the corresponding element described with reference to FIG. 3. Third output image 425 is an example of, or includes aspects of, the corresponding element described with reference to FIG. 3. Fourth output image 430 is an example of, or includes aspects of, the corresponding element described with reference to FIG. 3.

Figure 5:
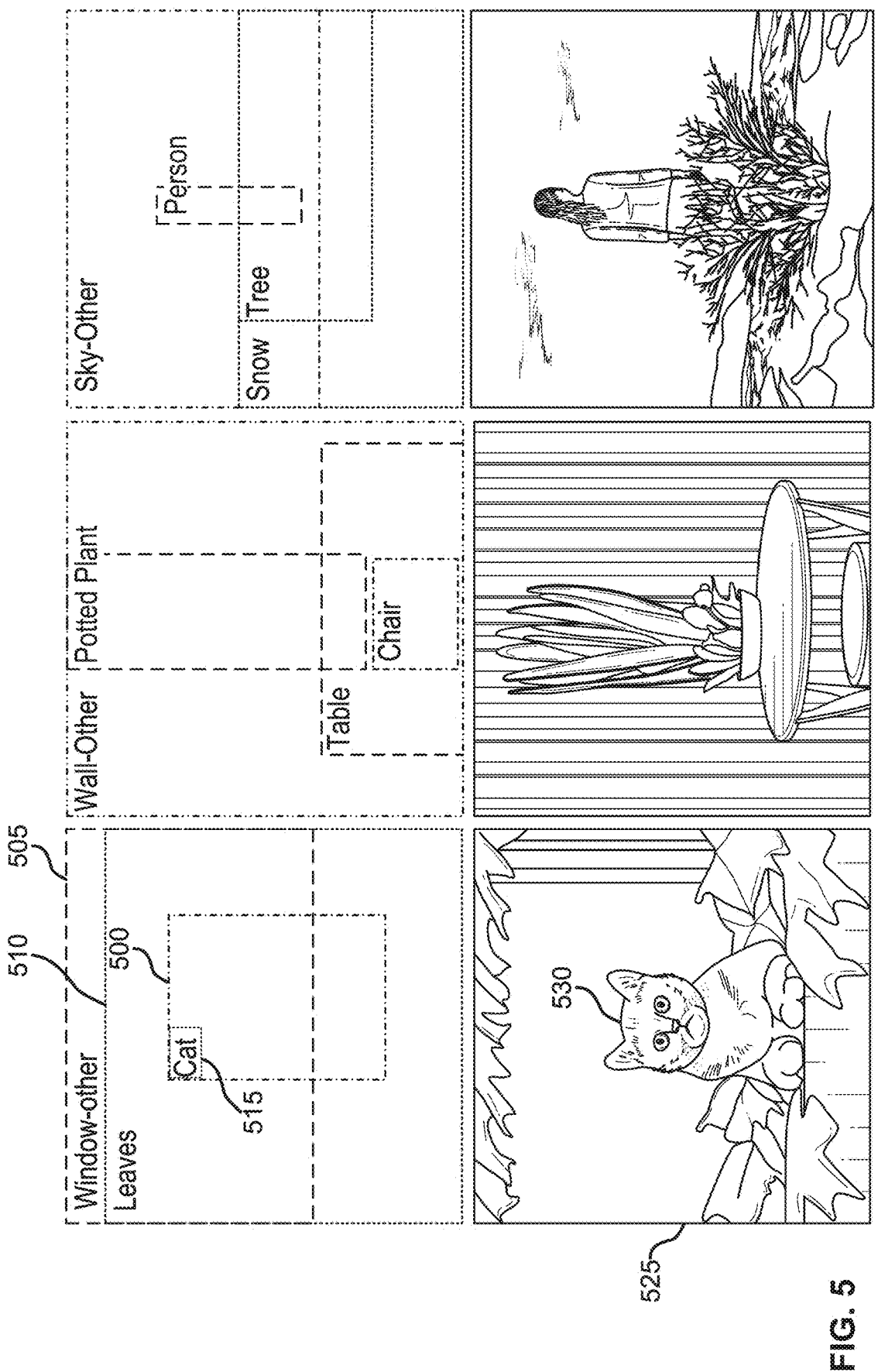
FIG. 5 shows an example of bounding box layout and synthesized images according to aspects of the present disclosure.

FIG. 5 shows an example of a bounding box layout and synthesized images according to aspects of the present disclosure. The example shown includes first bounding box 500, second bounding box 505, third bounding box 510, label 515, output image 520, and object 525. Output image 520 is an example of, or includes aspects of, the corresponding element described with reference to FIG. 12.

In some examples, the machine learning model is run on OpenLayout and OpenLayout-COCO datasets. For each sample, the machine learning model takes a varying precision level c from 0 to 6 as input to verify the effectiveness of precision control. The same precision level is used for all regions in an input layout, i.e., $\forall i, c_i = c$. As the precision level increases, the generated images follow the layout more closely. When c=0, the image compositions are not related to the layouts. For c=3 or 4, the generated images roughly resemble the shape and location specified in the layout. For c=5 or 6, the generated object contours match the layout more closely. At the lowest precision level, the machine learning model handles very rough layouts, e.g., bounding box layouts, despite not being trained on bounding box data.

In some examples, a sample includes one or more bounding box layouts (i.e., first bounding box 500, second bounding box 505, third bounding box 510). Label 515 ("cat" label) is associated with first bounding box 500. The machine learning model generates output image 520 based on first bounding box 500, second bounding box 505 and third bounding box 510. Output image 520 includes object 525 in a target region indicated by first bounding box 500.

Figure 6:
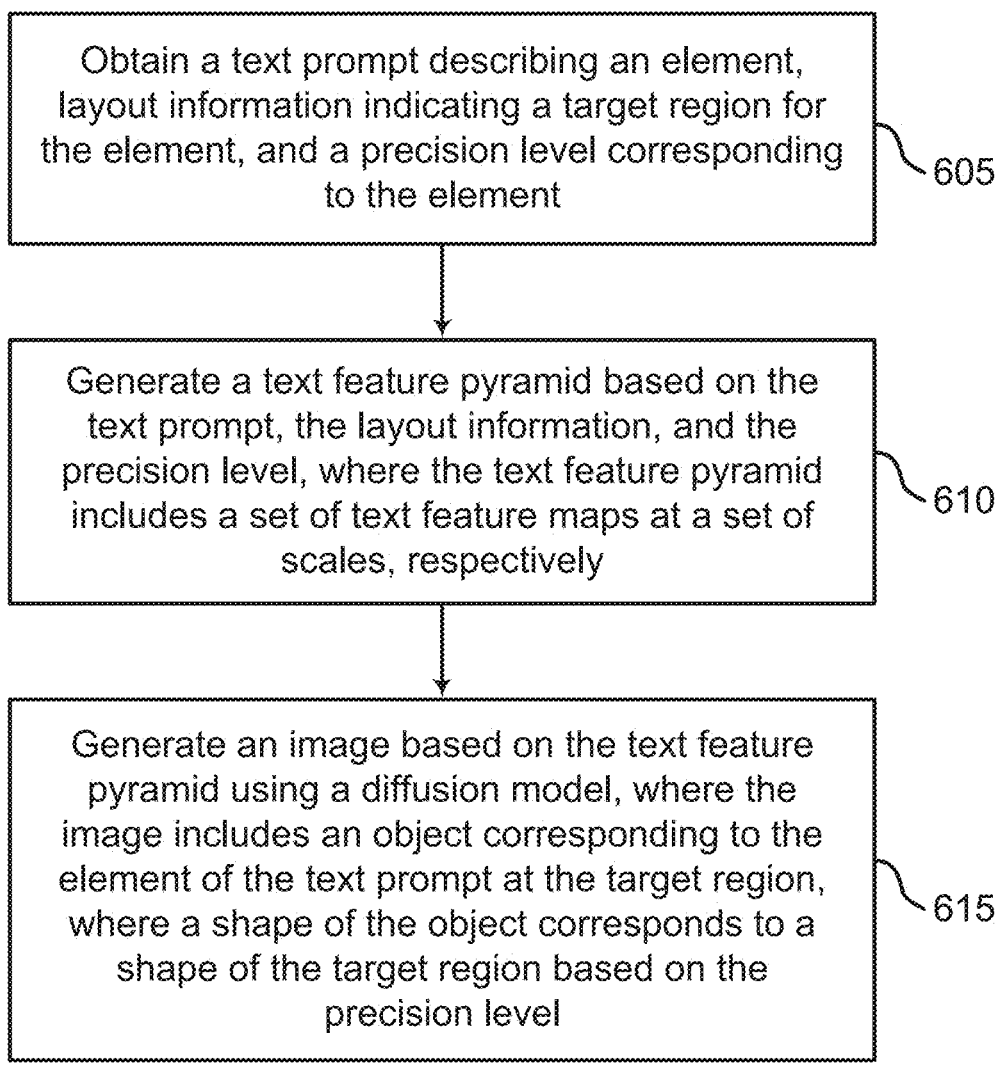
FIG. 6 shows an example of a method for image processing according to aspects of the present disclosure.

FIG. 6 shows an example of a method 600 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system obtains a text prompt describing an element, layout information indicating a target region for the element, and a precision level corresponding to the element. In some cases, the operations of this step refer to, or may be performed by, a user interface as described with reference to FIGS. 3, 4, 7, 10, and 11.

According to some embodiments of the present disclosure, an image processing apparatus is configured for conditional image synthesis. The image processing apparatus generates images from input semantic layouts of user-specified precision levels. The input semantic layouts range from text to a two-dimensional (2D) semantic canvas with precise shapes.

At operation 610, the system generates a text feature pyramid based on the text prompt, the layout information, and the precision level, where the text feature pyramid includes a set of text feature maps at a set of scales, respectively. In some cases, the operations of this step refer to, or may be performed by, a feature pyramid component as described with reference to FIGS. 7, 10, and 11.

In some embodiments, the machine learning model takes the representations to jointly encode precision level, semantics, and geometry information. The machine learning model generates a text feature map representation for encoding a semantic layout. This is a spatial extension of text embedding or generalization of segmentation masks from binary to continuous space.

The machine learning model generates a precision-encoded mask pyramid to model layout precision. A mask pyramid component of the machine learning model relates shape precision to levels in a pyramid representation and encodes precision by dropping out regions of lower precision levels. In some examples, the l-th level of the mask pyramid is a sub-layout (subset of regions) including semantic regions with precision level no less than l. By generating a text feature map for each sub-layout, the machine learning model generates a text feature pyramid as a unified representation of semantics, composition, and precision.

At operation 615, the system generates an image based on the text feature pyramid using a diffusion model, where the image includes an object corresponding to the element of the text prompt at the target region, where a shape of the object corresponds to a shape of the target region based on the precision level. In some cases, the operations of this step refer to, or may be performed by, a diffusion model as described with reference to FIGS. 7, 10, 12, and 13.

In some embodiments, the text feature pyramid is input to a multi-scale guided diffusion model to generate images. Training data is collected from sources such as large-scale image-text pairs and a relatively small pseudo layout/image dataset using text-based object detection and segmentation. With multi-source training strategy, text-to-image and layout-to-image can benefit from each other synergistically.

The multi-scale guided diffusion model is configured to synthesize images based on the text feature pyramid. A test dataset containing user-drawn layouts is collected for evaluation. The machine learning model generates high-quality images following layout information at user-specified precision levels. In some cases, the multi-scale guided diffusion model is referred to as a diffusion model for brevity.

Network Architecture

In FIGS. 7-13, an apparatus and method for image processing are described. One or more embodiments of the apparatus and method include at least one processor; at least one memory including instructions executable by the at least one processor; and a diffusion model comprising parameters stored in the at least one memory, wherein the diffusion model is trained to generate an image based on a text feature pyramid, wherein the image includes an object corresponding to an element of a text prompt at a target region, and wherein a shape of the object corresponds to a shape of the target region based on a user-specified precision level.

Some examples of the apparatus and method further include a named entity recognition (NER) component configured to identify a plurality of entities in the text prompt including the element.

Some examples of the apparatus and method further include a text encoder configured to encode the text prompt to obtain a text prompt embedding representing global information of the text prompt.

Some examples of the apparatus and method further include a user interface configured to identify the text prompt describing the element, layout information indicating the target region for the element of the text prompt, and the user-specified precision level corresponding to the element.

In some examples, the diffusion model comprises a U-net architecture including a plurality of input layers configured to receive input corresponding to each of a plurality of scales of the text feature pyramid, respectively.

Some examples of the apparatus and method further include a feature pyramid component configured to generate the text feature pyramid based on the text prompt, layout information indicating the target region for the element of the text prompt, and the user-specified precision level, wherein the text feature pyramid comprises a plurality of text feature maps at a plurality of scales, respectively.

Figure 7:
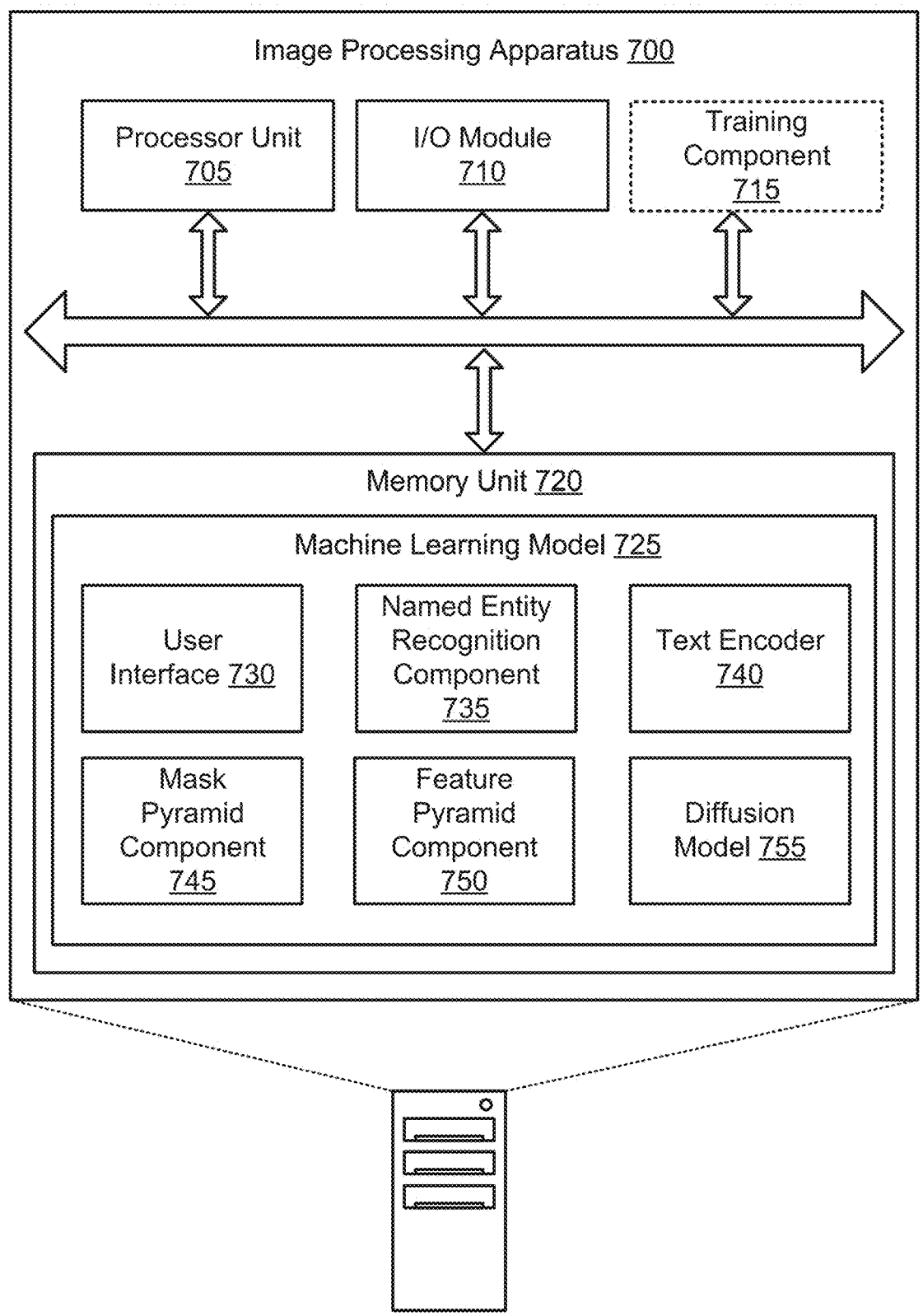
FIG. 7 shows an example of an image processing apparatus according to aspects of the present disclosure.

FIG. 7 shows an example of an image processing apparatus 700 according to aspects of the present disclosure. The example shown includes image processing apparatus 700, processor unit 705, I/O module 710, training component 715, memory unit 720, and machine learning model 725. Image processing apparatus 700 is an example of, or includes aspects of, the corresponding element described with reference to FIG. 1. In some examples, at least one processor executes one or more instructions to run or implement image processing apparatus 700.

Processor unit 705 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 705 is configured to operate a memory array using a memory controller. In other cases, a memory controller is integrated into the processor. In some cases, processor unit 705 is configured to execute computer-readable instructions stored in a memory to perform various functions. In some embodiments, processor unit 705 includes special purpose components for modem processing, baseband processing, digital signal processing, or transmission processing.

Examples of memory unit 720 include random access memory (RAM), read-only memory (ROM), or a hard disk. Examples of memory unit 720 include solid state memory and a hard disk drive. In some examples, memory unit 720 is used to store computer-readable, computer-executable software including instructions that, when executed, cause a processor to perform various functions described herein. In some cases, memory unit 720 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 720 store information in the form of a logical state.

In some examples, at least one memory unit 720 includes instructions executable by the at least one processor unit 705. Memory unit 720 includes machine learning model 725 or stores parameters of machine learning model 725.

I/O module 710 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 710 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 700 includes a computer implemented artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 700 includes a convolutional neural network (CNN) for image processing (e.g., image encoding, image decoding). CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 715 initializes a diffusion model 755. In some examples, training component 715 obtains training data including a set of training pairs, where each of the set of training pairs includes a training image and a text feature pyramid, and where the text feature pyramid includes a set of text feature maps at a set of scales based on a precision level corresponding to an object in the training image. Training component 715 trains the diffusion model 755 to generate images including one or more objects at respective target regions based on a user-specified precision level using the training data. In some examples, training component 715 computes a diffusion loss function. Training component 715 updates parameters of the diffusion model 755 based on the diffusion loss function.

In some examples, at least one memory includes instructions executable by the at least one processor. The at least one memory stores parameters of machine learning model 725. Machine learning model 725 is an example of, or includes aspects of, the corresponding element described with reference to FIGS. 10 and 11. In one embodiment, machine learning model 725 includes user interface 730, named entity recognition component 735, text encoder 740, mask pyramid component 745, feature pyramid component 750, and diffusion model 755. User interface 730 is an example of, or includes aspects of, the corresponding element described with reference to FIGS. 3, 4, 10, and 11.

According to some embodiments, named entity recognition component 735 is configured to identify a set of entities in the text prompt including the element. Named entity recognition component 735 is an example of, or includes aspects of, the corresponding element described with reference to FIG. 10.

According to some embodiments, text encoder 740 encodes the text prompt to obtain text features representing the element of the text prompt, where the text feature pyramid includes the text features.

According to some embodiments, text encoder 740 identifies a label for the object in the training image. In some examples, text encoder 740 encodes the label to obtain text features for the object, where the text feature pyramid is based on the text features.

In some examples, text encoder 740 is configured to encode the text prompt to obtain a text prompt embedding representing global information of the text prompt. Text encoder 740 is an example of, or includes aspects of, the corresponding element described with reference to FIG. 10.

According to some embodiments, mask pyramid component 745 generates a set of masks for the element at a set of resolutions, respectively, where a relationship between the target region and each of the set of masks is based on the precision level. In some examples, mask pyramid component 745 determines that a mask index is less than or equal to the precision level. Mask pyramid component 745 generates a non-zero mask of the set of masks corresponding to the target region based on the determination. In some examples, mask pyramid component 745 generates an initial mask corresponding to the target region. Mask pyramid component 745 resizes the initial mask to obtain the set of masks at the set of resolutions.

In some examples, mask pyramid component 745 identifies an additional region corresponding to the additional element. Mask pyramid component 745 generates a first set of masks corresponding to the target region and a second set of masks corresponding to the additional region, where the text feature pyramid is generated based on the first set of masks and the second set of masks.

According to some embodiments, mask pyramid component 745 segments the training image to obtain a mask corresponding to the object. In some examples, mask pyramid component 745 resizes the mask based on the set of scales to obtain a set of masks, where the text feature pyramid is generated based on the set of masks. Mask pyramid component 745 is an example of, or includes aspects of, the corresponding element described with reference to FIGS. 10 and 11.

According to some embodiments, feature pyramid component 750 generates a text feature pyramid based on the text prompt, the layout information, and the precision level, where the text feature pyramid includes a set of text feature maps at a set of scales, respectively. In some examples, feature pyramid component 750 applies the text features to a text feature map of the set of text feature maps based on a corresponding mask of a set of masks. In some examples, feature pyramid component 750 identifies an additional element in the text prompt, where the text feature pyramid includes text features corresponding to the element and additional text features corresponding to the additional element. In some examples, feature pyramid component 750 provides the set of text feature maps to a set of layers of the diffusion model 755 based on the set of scales, respectively.

According to some embodiments, feature pyramid component 750 is configured to generate the text feature pyramid based on the text prompt, layout information indicating the target region for the element of the text prompt, and the user-specified precision level, wherein the text feature pyramid comprises a plurality of text feature maps at a plurality of scales, respectively. Feature pyramid component 750 is an example of, or includes aspects of, the corresponding element described with reference to FIGS. 10 and 11.

According to some embodiments, diffusion model 755 generates an image based on the text feature pyramid, where the image includes an object corresponding to the element of the text prompt at the target region, where a shape of the object corresponds to a shape of the target region based on the precision level.

According to some aspects, diffusion model 755 includes parameters stored in the at least one memory, wherein diffusion model 755 is trained to generate an image based on a text feature pyramid, wherein the image includes an object corresponding to an element of a text prompt at a target region, and wherein a shape of the object corresponds to a shape of the target region based on a user-specified precision level. In some examples, diffusion model 755 includes a U-net architecture including a set of input layers configured to receive input corresponding to each of a set of scales of the text feature pyramid, respectively. Diffusion model 755 is an example of, or includes aspects of, the corresponding element described with reference to FIGS. 10, 12, and 13.

Figure 8:
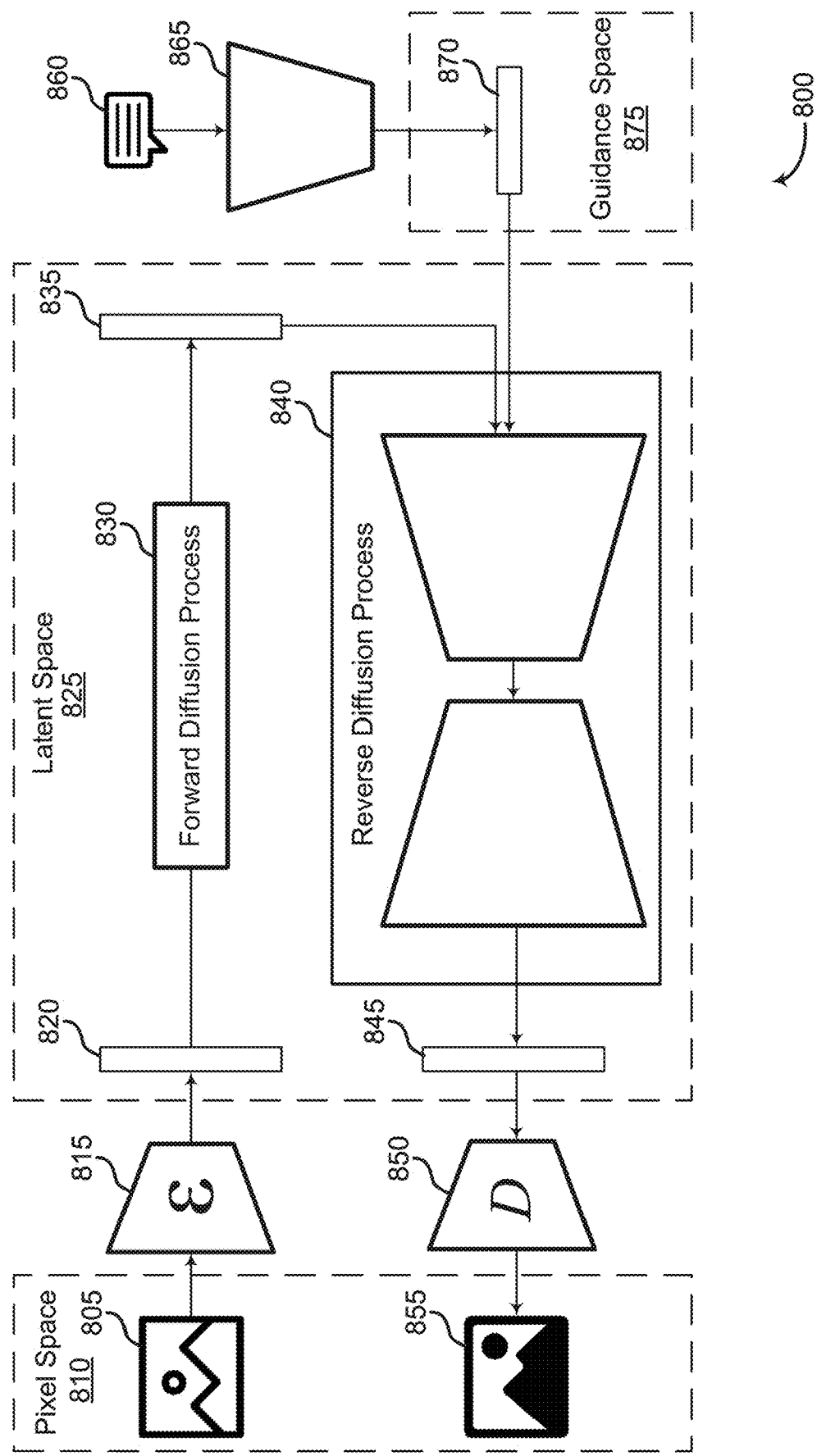
FIG. 8 shows an example of a latent diffusion model according to aspects of the present disclosure.

FIG. 8 shows an example of a latent diffusion model according to aspects of the present disclosure. The example shown includes guided latent diffusion model 800, original image 805, pixel space 810, image encoder 815, original image features 820, latent space 825, forward diffusion process 830, noisy features 835, reverse diffusion process 840, denoised image features 845, image decoder 850, output image 855, text prompt 860, text encoder 865, guidance features 870, and guidance space 875. FIG. 8 shows an example of a guided latent diffusion model 800. The guided latent diffusion model 800 is an example of, or includes aspects of, the corresponding element described with reference to FIG. 7 (i.e., diffusion model 755).

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 800 may take an original image 805 in a pixel space 810 as input and apply an image encoder 815 to convert original image 805 into original image features 820 in a latent space 825. Then, a forward diffusion process 830 gradually adds noise to the original image features 820 to obtain noisy features 835 (also in latent space 825) at various noise levels.

Next, a reverse diffusion process 840 (e.g., a U-Net ANN) gradually removes the noise from the noisy features 835 at the various noise levels to obtain denoised image features 845 in latent space 825. In some examples, the denoised image features 845 are compared to the original image features 820 at each of the various noise levels, and parameters of the reverse diffusion process 840 of the diffusion model are updated based on the comparison. Finally, an image decoder 850 decodes the denoised image features 845 to obtain an output image 855 in pixel space 810. In some cases, an output image 855 is created at each of the various noise levels. The output image 855 can be compared to the original image 805 to train the reverse diffusion process 840.

In some cases, image encoder 815 and image decoder 850 are pre-trained prior to training the reverse diffusion process 840. In some examples, they are trained jointly, or the image encoder 815 and image decoder 850 and fine-tuned jointly with the reverse diffusion process 840.

The reverse diffusion process 840 can also be guided based on a text prompt 860, or another guidance prompt, such as an image, a layout, a segmentation map, etc. The text prompt 860 can be encoded using a text encoder 865 (e.g., a multimodal encoder) to obtain guidance features 870 in guidance space 875. The guidance features 870 can be combined with the noisy features 835 at one or more layers of the reverse diffusion process 840 to ensure that the output image 855 includes content described by the text prompt 860. For example, guidance features 870 can be combined with the noisy features 835 using a cross-attention block within the reverse diffusion process 840.

Original image 805 is an example of, or includes aspects of, the corresponding element described with reference to FIG. 20. Forward diffusion process 830 is an example of, or includes aspects of, the corresponding element described with reference to FIG. 20. Reverse diffusion process 840 is an example of, or includes aspects of, the corresponding element described with reference to FIG. 20. Output image 855 is an example of, or includes aspects of, the corresponding element described with reference to FIG. 12.

Figure 9:
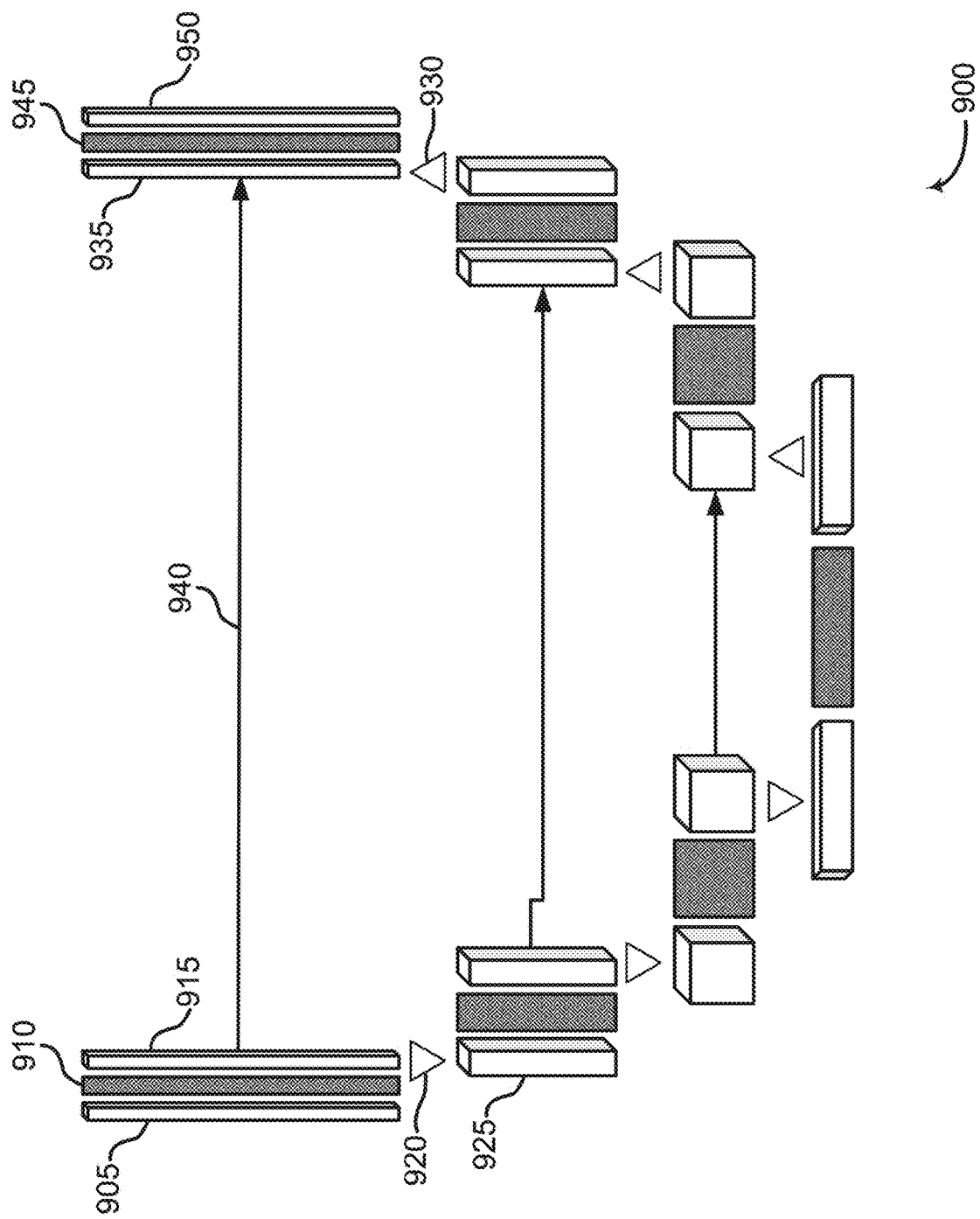
FIG. 9 shows an example of U-Net architecture according to aspects of the present disclosure.

FIG. 9 shows an example of U-Net 900 architecture according to aspects of the present disclosure. The example shown includes U-Net 900, input features 905, initial neural network layer 910, intermediate features 915, down-sampling layer 920, down-sampled features 925, up-sampling process 930, up-sampled features 935, skip connection 940, final neural network layer 945, and output features 950. The U-Net 900 is an example of, or includes aspects of, the architecture used within the reverse diffusion process described with reference to FIGS. 12-13.

In some examples, diffusion models are based on a neural network architecture known as a U-Net. The U-Net 900 takes input features 905 having an initial resolution and an initial number of channels, and processes the input features 905 using an initial neural network layer 910 (e.g., a convolutional network layer) to produce intermediate features 915. The intermediate features 915 are then down-sampled using a down-sampling layer 920 such that down-sampled features 925 features have a resolution less than the initial resolution and a number of channels greater than the initial number of channels.

This process is repeated multiple times, and then the process is reversed. That is, the down-sampled features 925 are up-sampled using up-sampling process 930 to obtain up-sampled features 935. The up-sampled features 935 can be combined with intermediate features 915 having a same resolution and number of channels via a skip connection 940. These inputs are processed using a final neural network layer 945 to produce output features 950. In some cases, the output features 950 have the same resolution as the initial resolution and the same number of channels as the initial number of channels.

In some cases, U-Net 900 takes additional input features to produce conditionally generated output. For example, the additional input features could include a vector representation of an input prompt. The additional input features can be combined with the intermediate features 915 within the neural network at one or more layers. For example, a cross-attention module can be used to combine the additional input features and the intermediate features 915.

Figure 10:
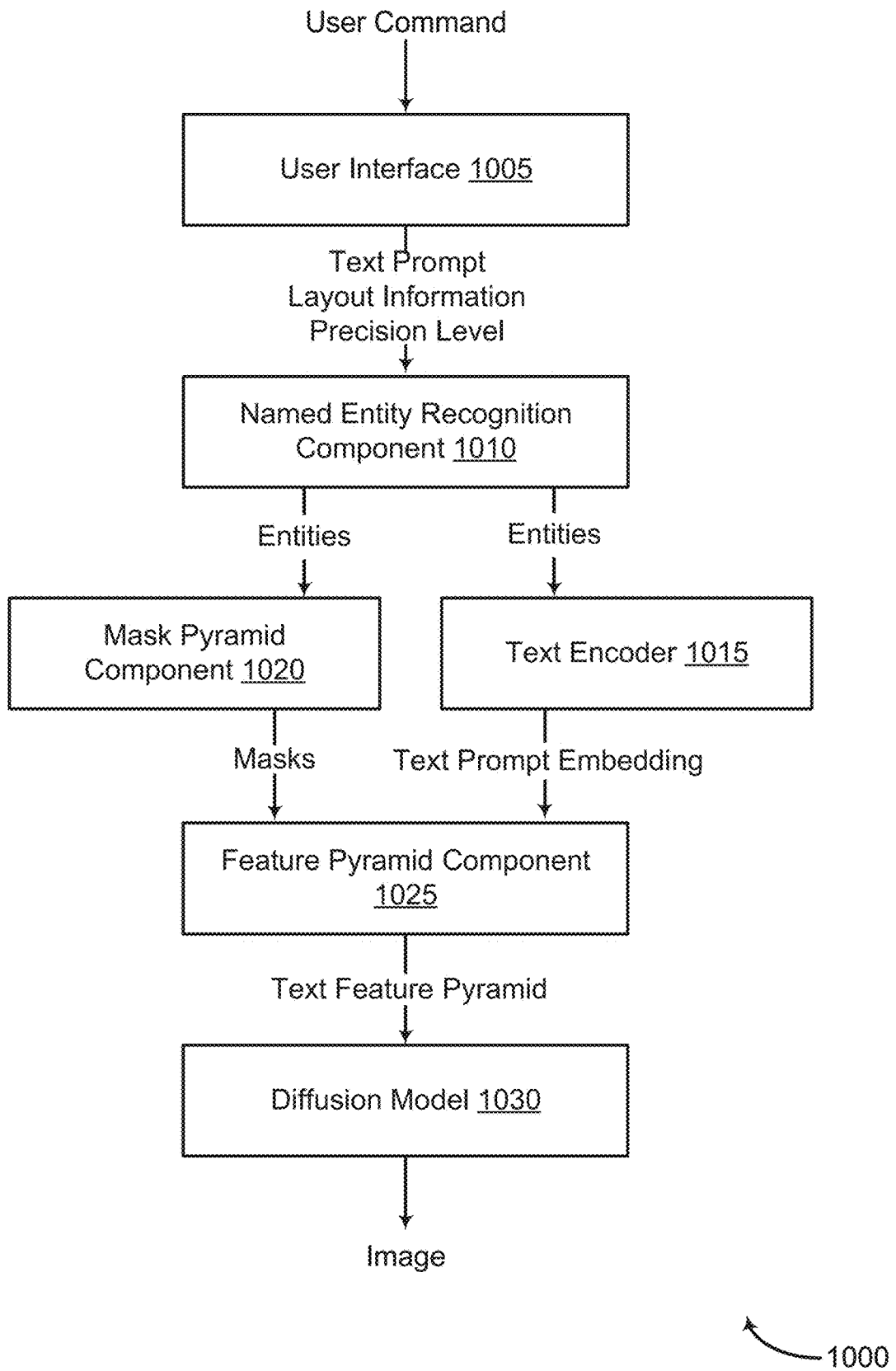
FIGS. 10 and 11 show examples of a machine learning model according to aspects of the present disclosure.

FIG. 10 shows an example of a machine learning model 1000 according to aspects of the present disclosure. The example shown includes machine learning model 1000, user interface 1005, named entity recognition component 1010, text encoder 1015, mask pyramid component 1020, feature pyramid component 1025, and diffusion model 1030. Machine learning model 1000 is an example of, or includes aspects of, the corresponding element described with reference to FIGS. 7 and 11. User interface 1005 is an example of, or includes aspects of, the corresponding element described with reference to FIGS. 3, 4, 7, and 11.

In some embodiments, machine learning model 1000 obtains a text prompt describing an element (e.g., "a blue dog"), layout information indicating a target region for the element, and a precision level corresponding to the element, via user interface 1005. In some cases, named entity recognition component 1010 is configured to identify a set of entities in the text prompt including the element. For example, the set of entities includes "a blue dog", "a big burger", and "oil painting". Named entity recognition component 1010 is an example of, or includes aspects of, the corresponding element described with reference to FIG. 7.

Text encoder 1015 encodes the text prompt to obtain text features representing the element of the text prompt, where the text feature pyramid includes the text features. The text features are also referred to as text prompt embedding. Text encoder 1015 is an example of, or includes aspects of, the corresponding element described with reference to FIG. 7.

Mask pyramid component 1020 generates a set of masks for the element at a set of resolutions, respectively, where a relationship between the target region and each of the set of masks is based on the precision level. Mask pyramid component 1020 is an example of, or includes aspects of, the corresponding element described with reference to FIGS. 7 and 11.

Feature pyramid component 1025 generates a text feature pyramid based on the text prompt, the layout information, and the precision level. The text feature pyramid includes a set of text feature maps at a set of scales, respectively. Feature pyramid component 1025 is an example of, or includes aspects of, the corresponding element described with reference to FIGS. 7 and 11.

Diffusion model 1030 generates an image based on the text feature pyramid, where the image includes an object corresponding to the element of the text prompt at the target region. A shape of the object corresponds to a shape of the target region based on the precision level. Diffusion model 1030 is an example of, or includes aspects of, the corresponding element described with reference to FIGS. 7, 12, and 13.

Figure 11:
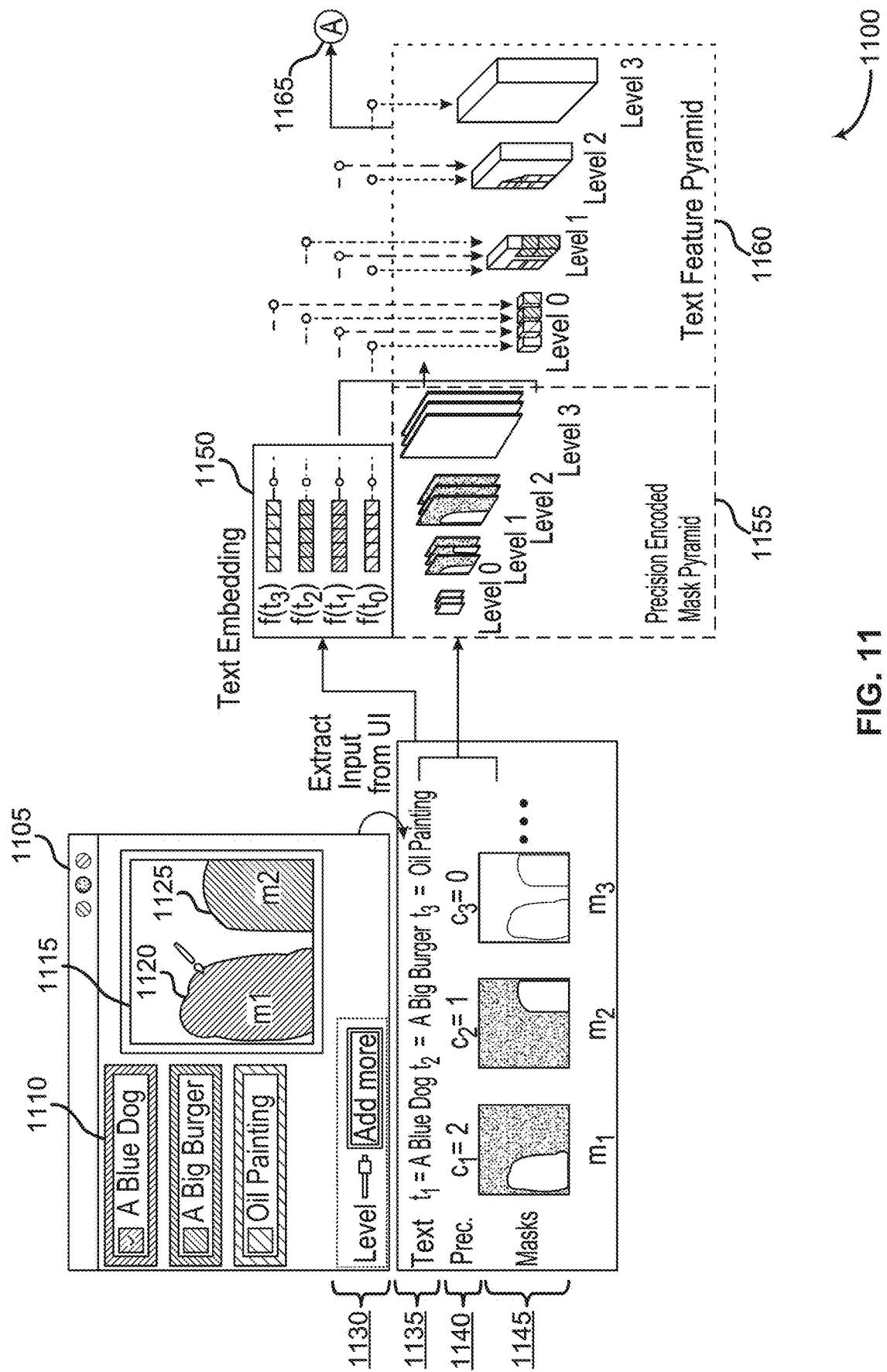

FIG. 11 shows an example of a machine learning model 1100 according to aspects of the present disclosure. The example shown includes machine learning model 1100, user interface 1105, text prompt 1110, layout information 1115, target region 1120, additional region 1125, precision level control element 1130, entities 1135, precision levels 1140, masks 1145, text features 1150, mask pyramid component 1155, feature pyramid component 1160, and text feature maps 1165. Machine learning model 1100 is an example of, or includes aspects of, the corresponding element described with reference to FIGS. 7 and 10.

According to some embodiments of the present disclosure, machine learning model 1100 is configured to generate images from an input semantic layout including a set of semantic regions of varying precision levels 1140. An input semantic layout is formulated as a list of tuples $\{(M_i, t_i, c_i)\}_{i=1}^n$, where $M_i$, $t_i$, $c_i$ indicate the segmentation mask, text description, and the precision level of the i-th region. In some examples, machine learning model 1100, via user interface 1105, obtains text prompt 1110 and layout information 1115. Layout information 1115 indicates target region 1120 for a first element and additional region 1125 for a second element. Machine learning model 1100, via precision level control element 1130 (e.g., adjust a precision level bar to adjust a degree of precision), obtains a precision level corresponding to an element.

In some examples, entities 1135 include "a blue dog", "a big burger" and "oil painting". Precision levels 1140 corresponding to entities 1135 "a blue dog", "a big burger" and "oil painting" are set to 2, 1, and 0, respectively.

Let M, t, c denote sets of masks, texts and precision levels of a set of regions, respectively. The precision level variable $c_i \in \mathbb{N}_{\leq L}$ indicates how precisely the generated content should follow the mask $M_i$. Smaller value of $c_i$ indicates a less precise control and allows more deviation from the mask $M_i$. $c_i=0$ indicates the coarsest level where the i-th mask is to be ignored. For example, it becomes text-to-image generation when all $c_i=0$.

In some embodiments, a text encoder is configured to encode the text prompt to obtain text features 1150 representing the element of the text prompt, where the text feature pyramid includes the text features. Entities 1135, precision levels 1140 and masks 1145 are input to mask pyramid component 1155 to generate a mask pyramid.

In some embodiments, a precision-encoded mask pyramid $\{M^l\}_{l=0}^{L}$, which represents each mask at the given precision level, is formulated to generate an image at resolution $2^L \times 2^L$. The mask pyramid is combined with the text descriptions t, via feature pyramid component 1160, to form a text feature pyramid $\{Z^l\}_{l=0}^{L}$. The text feature pyramid $\{Z^l\}_{l=0}^{L}$ contains a $2^l \times 2^l$ text feature map at each level, which is considered an extension of the one-hot label map encoding in segmentation-to-image. In some embodiments, a multi-level guided diffusion model takes the text feature pyramid (e.g., text feature maps 1165) as input to generate an image. Details with regard to the diffusion model of machine learning model 1100 for image generation are described in FIG. 12.

In some embodiments, users, via user interface 1105, can define a layout using a semantic brush associated with a free-form text description and adjustable precision level. Precision levels 1140 corresponding to entities 1135 are managed via precision level control element 1130 of user interface 1105. The masks, regional descriptions, and precision levels $\{(M_i, t_i, c_i)\}_i$ are jointly encoded into a text feature pyramid (i.e., output of feature pyramid component 1160), and then translated into an image by a multi-scale guided diffusion model.

User interface 1105 is an example of, or includes aspects of, the corresponding element described with reference to FIGS. 3, 4, 7, and 10. Text prompt 1110 is an example of, or includes aspects of, the corresponding element described with reference to FIGS. 3 and 4. Target region 1120 is an example of, or includes aspects of, the corresponding element described with reference to FIGS. 3 and 4.

Mask pyramid component 1155 is an example of, or includes aspects of, the corresponding element described with reference to FIGS. 7 and 10. Feature pyramid component 1160 is an example of, or includes aspects of, the corresponding element described with reference to FIGS. 7 and 10. Text feature maps 1165 is an example of, or includes aspects of, the corresponding element described with reference to FIGS. 12 and 13.

Figure 12:
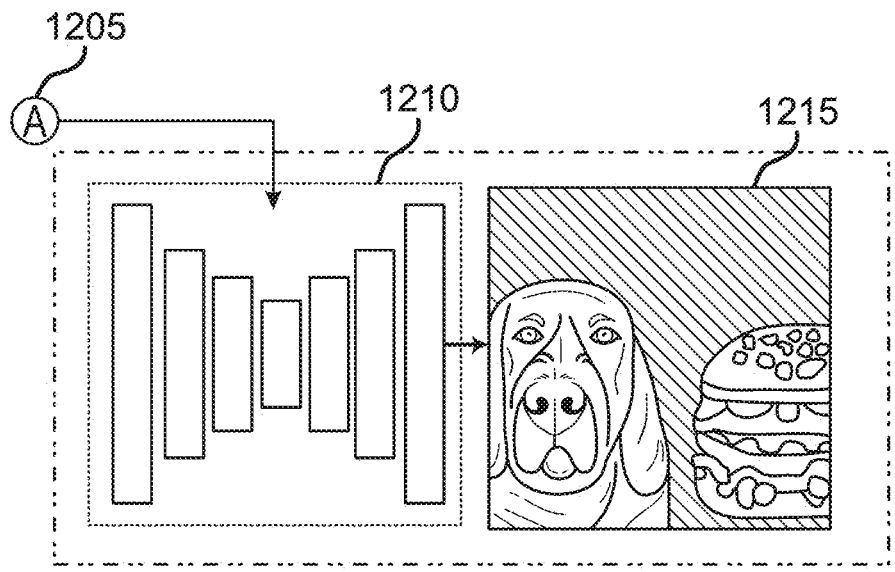
FIG. 12 shows an example of diffusion model of a machine learning model according to aspects of the present disclosure.

FIG. 12 shows an example of diffusion model 1200 of a machine learning model according to aspects of the present disclosure. The example shown includes diffusion model 1200, text feature maps 1205, U-Net 1210, and output image 1215.

In some embodiments, a multi-level guided diffusion model takes the text feature pyramid as input to generate an image. In some examples, the diffusion model includes U-Net 1210. U-Net 1210 takes a set of text feature maps 1205 as input and generates output image 1215.

Referring to FIGS. 11 and 12, output image 1215 includes a "dog" object corresponding to the element of the text prompt 1110 at the target region 1120, wherein a shape of the "dog" object corresponds to a shape of the target region 1120 based on precision level $c_1$. Output image 1215 also includes a "burger" object corresponding to the element of the text prompt 1110 at the additional region 1125, wherein a shape of the "burger" object corresponds to a shape of the additional region 1125 based on precision level $c_2$. Output image 1215 is generated based on layout information 1115 indicating target region 1120 and additional region 1125 and a precision level corresponding to the element (e.g., "dog", "burger").

Diffusion model 1200 is an example of, or includes aspects of, the corresponding element described with reference to FIGS. 7, 10, and 13. Text feature maps 1205 is an example of, or includes aspects of, the corresponding element described with reference to FIGS. 11 and 13. U-Net 1210 is an example of, or includes aspects of, the corresponding element described with reference to FIG. 13. Output image 1215 is an example of, or includes aspects of, the corresponding element described with reference to FIG. 5.

Figure 13:
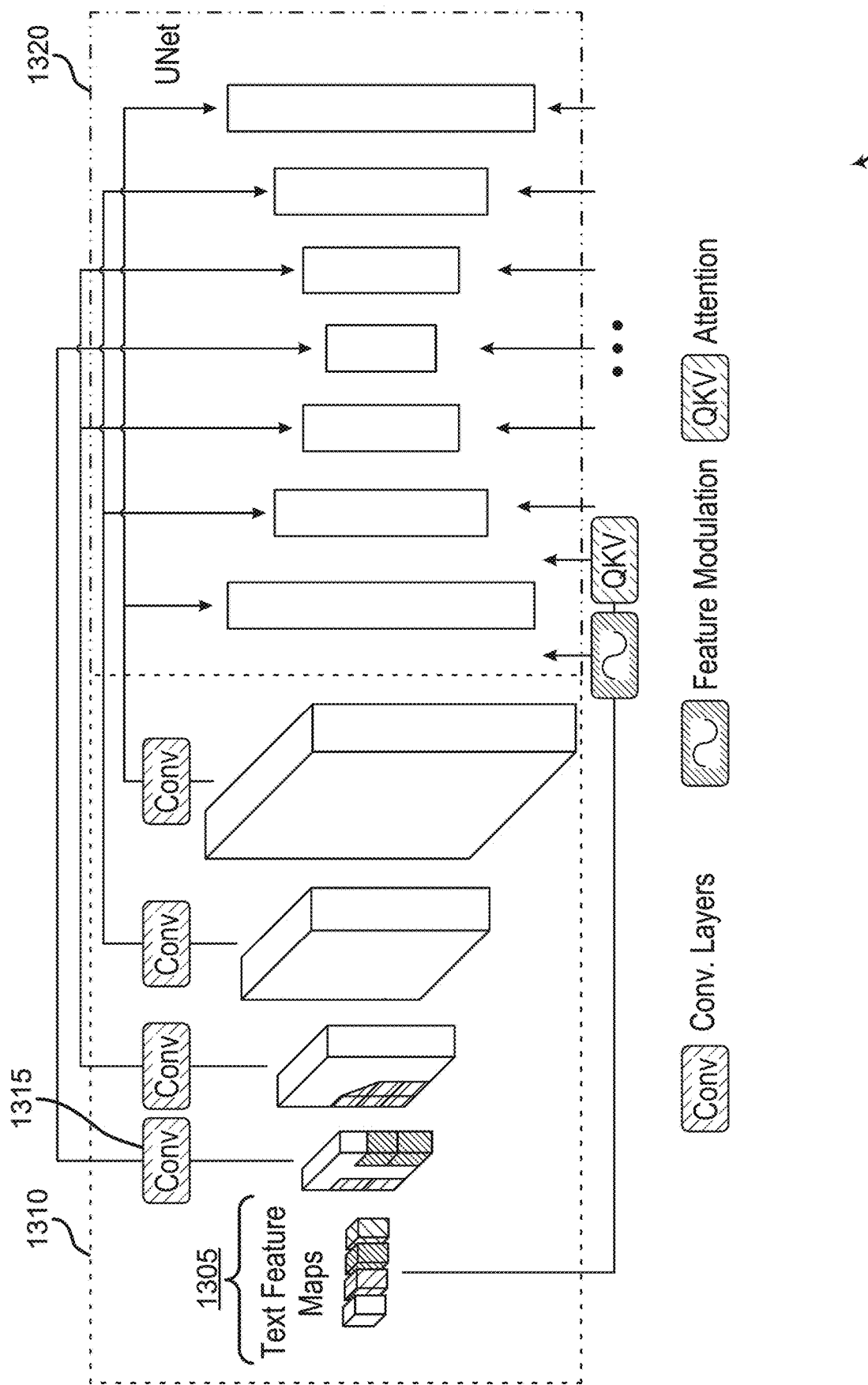
FIG. 13 shows an example of a multi-scale guided diffusion model according to aspects of the present disclosure.

FIG. 13 shows an example of a multi-scale guided diffusion model 1300 according to aspects of the present disclosure. The example shown includes diffusion model 1300, text feature maps 1305, text feature pyramid 1310, convolutional layer 1315, and U-Net 1320.

In one or more embodiments of the present disclosure, a multi-scale guided (and feature map conditioned) diffusion model 1300 is configured to generate images based on a text feature pyramid 1310. The diffusion model 1300 involves a $\epsilon$-prediction and training objective is formulated as follows, $$L = \mathbb{E}_{\epsilon \sim \mathcal{N}(0,1), t \sim [1,T]}\left[\|\epsilon - \epsilon_\theta(x_t, z, t)\|_2^2\right], \quad (1)$$

where T is the number of diffusion steps, $x_t$ is a noisy version of the ground-truth image x at the t-th diffusion step, z is the conditional signal, which is the text feature pyramid $\{Z^l\}_{l=0}^{L}$, and $\epsilon_\theta$ represents the network parameterized by $\theta$.

In some embodiments, U-Net 1320 architecture is modified by adding convolutional layers 1315 to combine each text feature map with the U-Net feature maps of the corresponding resolution. The 0-th level text feature maps $Z^0$ are passed through multiple blocks using cross-modal attention and channel-wise feature modulation.

The diffusion model 1300 is based on classifier-free guidance to increase the performance of conditional diffusion models. Here, one embodiment incorporates multi-scale spatial guidance for the feature map conditioned diffusion model. In text feature maps from level 1 to L, the unspecified regions are the embedding of a null token f(Ø). In some examples, dropout with probability 0.1 is further applied to $Z^0$ by setting $Z^0=f(Ø)$. Some embodiments, during inference, estimate two diffusion scores conditioning on the given text feature pyramid and an empty feature pyramid of repeating f(Ø), and then perform sampling using their linear combination.

Diffusion model 1300 is an example of, or includes aspects of, the corresponding element described with reference to FIGS. 7, 10, and 12. Text feature maps 1305 is an example of, or includes aspects of, the corresponding element described with reference to FIGS. 11 and 12. U-Net 1320 is an example of, or includes aspects of, the corresponding element described with reference to FIG. 12.

Mask Pyramid and Text Feature Pyramid

Figure 14:
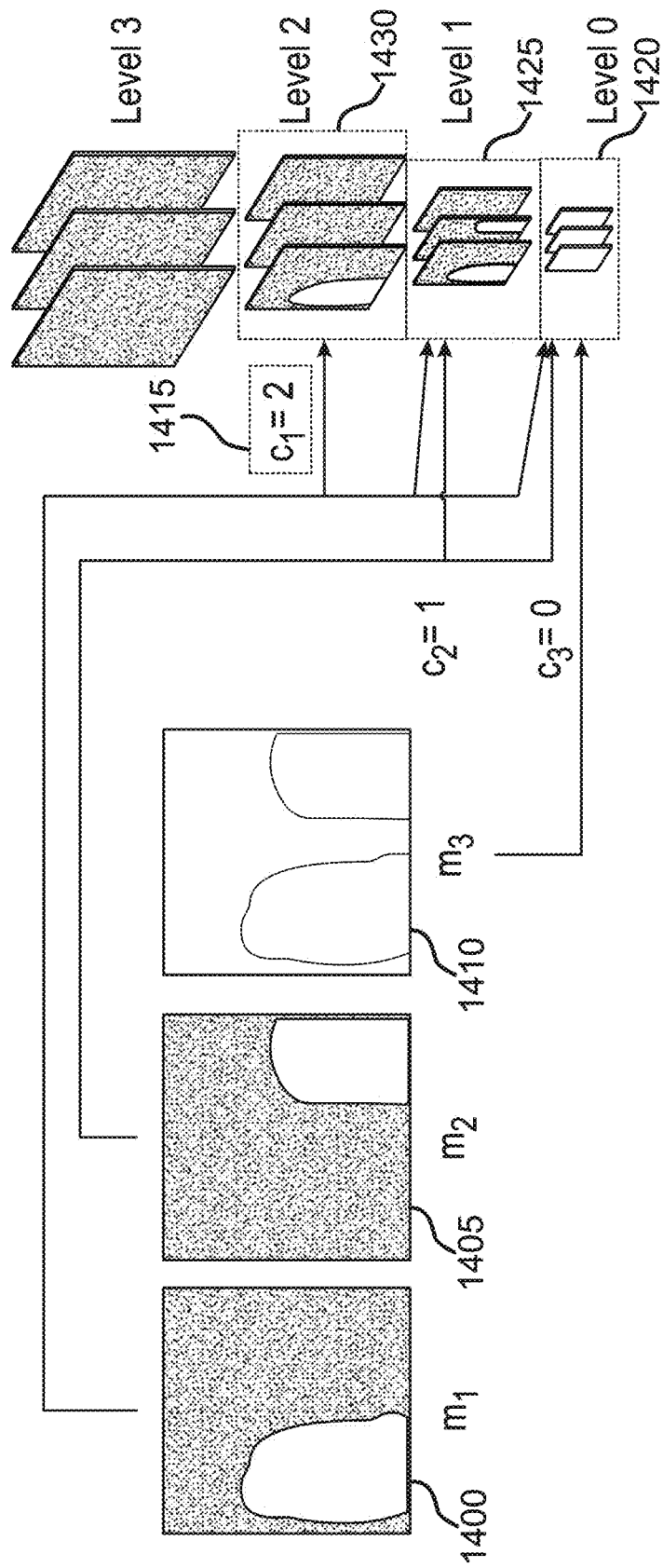
FIG. 14 shows an example of a precision-encoded mask pyramid according to aspects of the present disclosure.

FIG. 14 shows an example of a precision-encoded mask pyramid according to aspects of the present disclosure. The example shown includes first mask 1400, second mask 1405, third mask 1410, precision level 1415, initial level 1420, first level 1425, and second level 1430.

According to some embodiments of the present disclosure, the machine learning model is configured to model the exact precision for a user-specified coarse shape (e.g., brushes drawn on a canvas by a user). In some cases, type and the amount of error vary across different users. The machine learning model takes a precision-encoded mask pyramid as input to encode the shape and precision information simultaneously to relate precision to resolutions. Given a mask and a precision level, a high precision level corresponds to using all details of the masks at a high resolution, while a low precision level indicates that only the masks at a low resolution are used in image synthesis.

In some embodiments of the present disclosure, given a set of masks $M=[m_1, \ldots, m_n]$ and the precision levels $c=[c_1, \ldots, c_n]$, the mask pyramid are constructed by representing each mask $M_i$ at resolutions up to $2^{c_i}$. With regards to mask pyramid construction, the machine learning model resizes each mask $M_i$ to multiple resolutions and drops out the masks at resolutions higher than $2^{c_i}$. The l-th layer of the mask pyramid, denoted as $M^l$, is computed as follows:

$$M_i^l = \text{resize}(M_i, 2^l) \cdot \mathbb{1}_{c_i \geq l}, \quad (2)$$

where $\text{resize}(M_i, 2^l)$ resizes a mask $M_i$ to $2^l \times 2^l$ resolution through image interpolation and binarization.

The indicator function $\mathbb{1}_{c_i \geq 1}$ returns 1 when $c_i \geq 1$ and 0 when $c_i < 1$. For example, the range of precision levels is set to [0, 3, 4, 5, 6]. For free-hand drawn layout, 8×8 masks at the level 3 are informative, and 64×64 masks at the level 6 capture sufficient details.

FIG. 14 shows an example of a precision-encoded mask pyramid. The first level has two non-zero masks corresponding to $m_1$, $m_2$ as $c_1$, $c_2 \geq 1$; the second level has $m_1$ as $c_1 = 2$, $c_2 < 2$. The third level does not have any non-zero masks as all the precision levels of all masks are lower than 3.

In some examples, first level 1425 includes first mask 1400 and second mask 1405 because precision level 1415 corresponding to first mask 1400 and second mask 1405 is set more than or equal to the mask index (i.e., l=1 or level 1). Second level 1430 includes first mask 1400 but not second mask 1405 because precision level 1415 corresponding to second mask 1405 is set less than the mask index (i.e., l=2 or level 2). In some cases, the mask index refers to the l-th layer of the precision-encoded mask pyramid. The precision-encoded mask pyramid is also referred to as a mask pyramid for brevity.

In some examples, third mask 1410 is included in initial level 1420 but not included in first level 1425 or second level 1430 of the mask pyramid because precision level 1415 corresponding to third mask 1410 is set less than or equal to the mask index (i.e., l=0 or level 0).

First mask 1400 is an example of, or includes aspects of, the corresponding element described with reference to FIG. 15. Second mask 1405 is an example of, or includes aspects of, the corresponding element described with reference to FIG. 15. Third mask 1410 is an example of, or includes aspects of, the corresponding element described with reference to FIG. 15.

Figure 15:
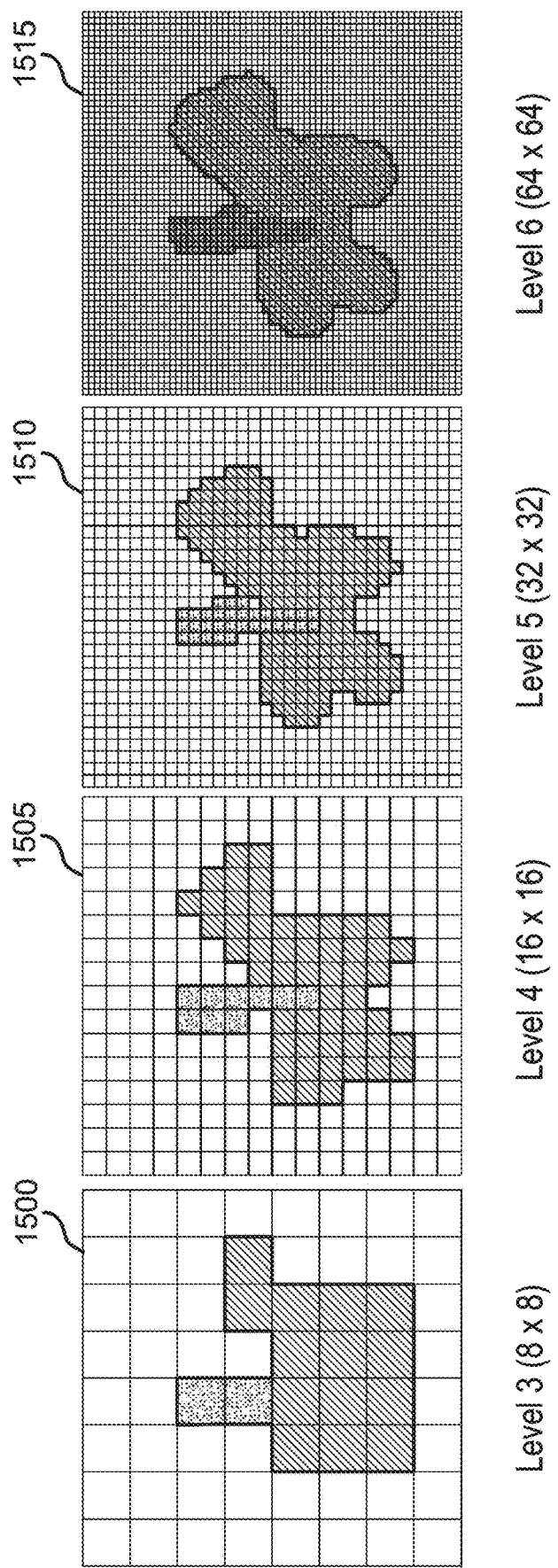
FIG. 15 shows an example of masks at different levels of a pyramid according to aspects of the present disclosure.

FIG. 15 shows an example of masks at different levels of a precision-encoded mask pyramid according to aspects of the present disclosure. The example shown includes first mask 1500, second mask 1505, third mask 1510, and fourth mask 1515. The precision-encoded mask pyramid is also referred to as a mask pyramid for brevity.

In some examples, the range of precision levels is set to [0, 3, 4, 5, 6]. For free-hand drawn layout, 8×8 masks at the level 3 are informative, and 64×64 masks at the level 6 capture sufficient details. At level 3, first mask 1500 is 8×8. At level 4, second mask 1505 is 16×16. At level 5, third mask 1510 is 32×32. At level 6, fourth mask 1515 is 64×64.

First mask 1500 is an example of, or includes aspects of, the corresponding element described with reference to FIG. 14. Second mask 1505 is an example of, or includes aspects of, the corresponding element described with reference to FIG. 14. Third mask 1510 is an example of, or includes aspects of, the corresponding element described with reference to FIG. 14.

Figure 16:
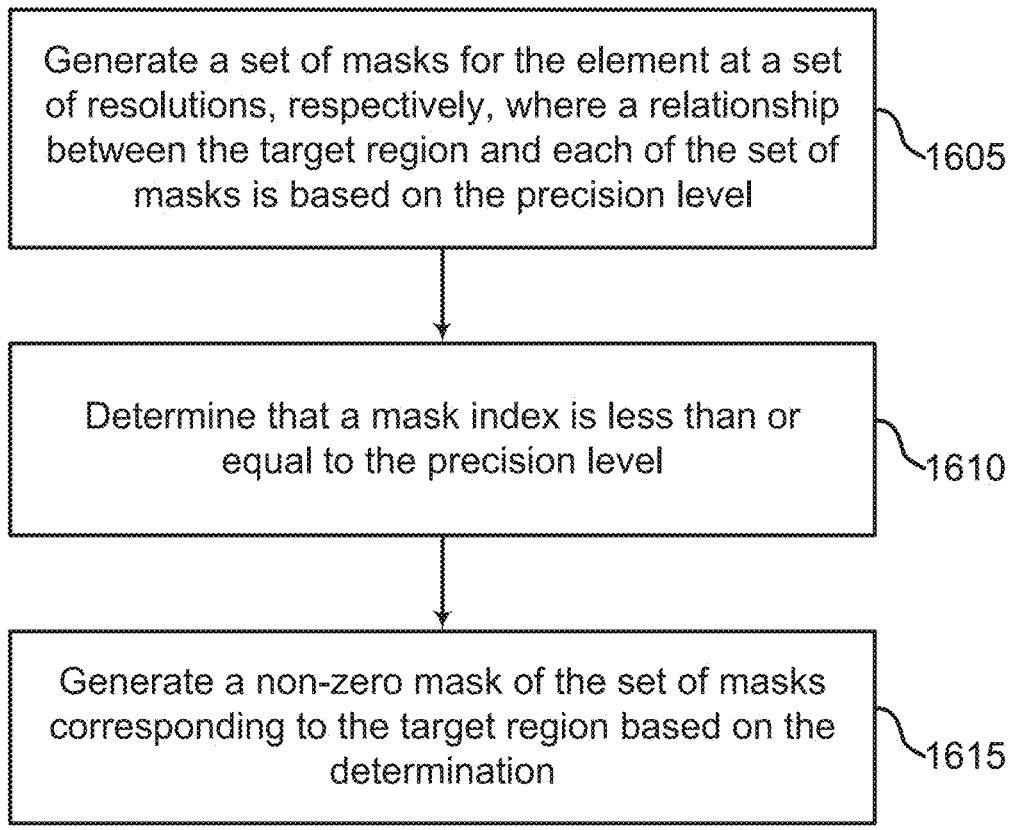
FIG. 16 shows an example of a method for generating a mask pyramid according to aspects of the present disclosure.

FIG. 16 shows an example of a method 1600 for generating a mask pyramid according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system generates a set of masks for the element at a set of resolutions, respectively, where a relationship between the target region and each of the set of masks is based on the precision level. In some cases, the operations of this step refer to, or may be performed by, a mask pyramid component as described with reference to FIGS. 7, 10, and 11.

In some embodiments, the machine learning model is configured to generate an initial mask corresponding to the target region. The mask pyramid component resizes the initial mask to multiple resolutions through image interpolation and binarization to obtain a set of masks of various resolutions. Each of the set of masks corresponds to a mask index.

At operation 1610, the system determines that a mask index is less than or equal to the precision level. In some cases, the operations of this step refer to, or may be performed by, a mask pyramid component as described with reference to FIGS. 7, 10, and 11.

In some embodiments, the mask index refers to the l-th layer of the precision-encoded mask pyramid. In some cases, given a set of initial masks $M=[m_1, \ldots, m_n]$ and the corresponding precision levels $c=[c_1, \ldots, c_n]$, the mask pyramid is generated by representing mask $M_i$ at resolutions up to $2^{c_i}$. With regards to mask pyramid generation, the machine learning model resizes mask $M_i$ to multiple resolutions and drops out the masks at resolutions higher than $2^{c_i}$ when the mask pyramid component determines that the mask index value is higher than the precision level value.

At operation 1615, the system generates a non-zero mask of the set of masks corresponding to the target region based on the determination that the mask index is less than or equal to the precision level. In some cases, the operations of this step refer to, or may be performed by, a mask pyramid component as described with reference to FIGS. 7, 10, and 11.

In some embodiments, the machine learning model takes a precision-encoded mask pyramid as input to encode the shape and precision information simultaneously to relate precision information to resolutions. Given a mask and a precision level, a high precision level indicates that details of the masks are used at a high resolution, while a low precision level indicates that the masks at a low resolution are used in image synthesis.

In some embodiments, the non-zero mask is computed by applying an indicator function $\mathbb{1}_{c_i \geq l}$ to the resized masks. The indicator function $\mathbb{1}_{c_i \geq l}$ returns 1 when $c_i \geq 1$ and 0 when $c_i < 1$. In some cases, $c_i \geq 1$ and $\mathbb{1}_{c_i \geq l} = 1$. The resized mask is preserved to be the l-th layer of the mask pyramid. In other cases, $c_i < 1$ and $\mathbb{1}_{c_i \geq l} = 0$. The resized mask is dropped out.

Figure 17:
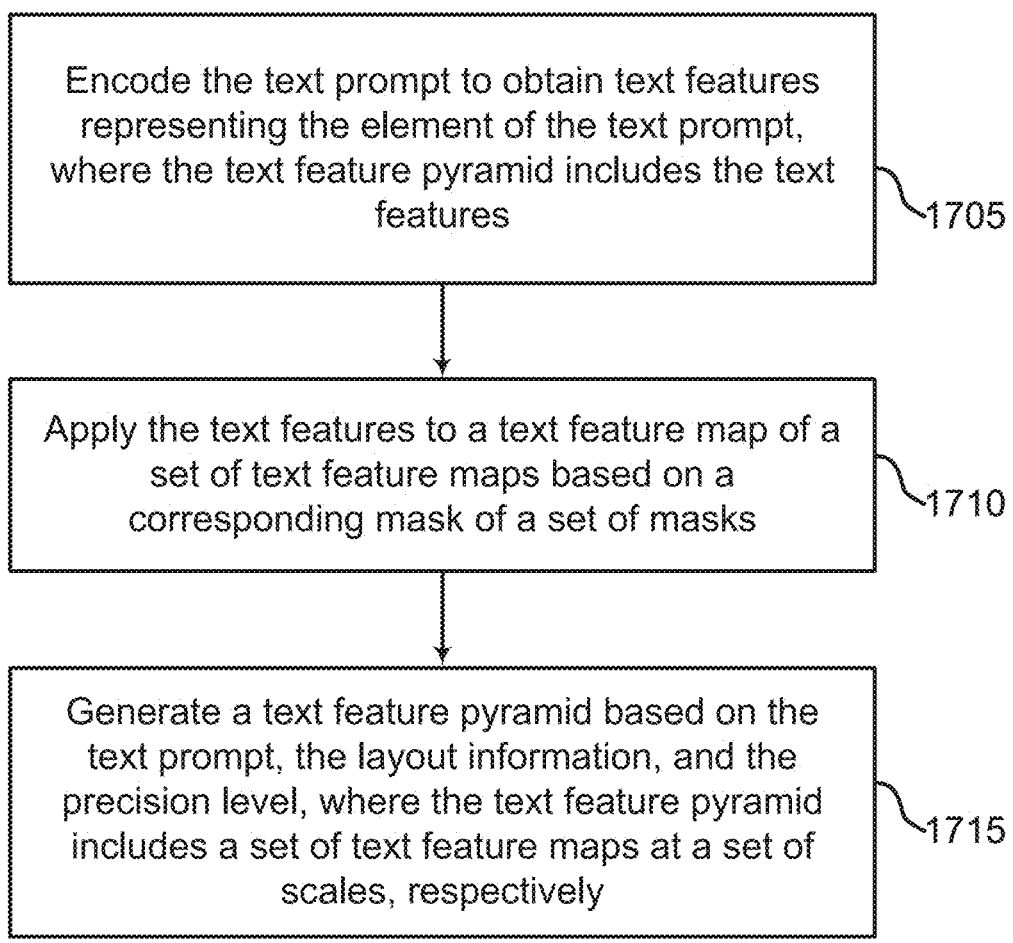
FIG. 17 shows an example of a method for generating a text feature pyramid according to aspects of the present disclosure.

FIG. 17 shows an example of a method 1700 for generating a text feature pyramid according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system encodes the text prompt to obtain text features representing the element of the text prompt, where the text feature pyramid includes the text features. In some cases, the operations of this step refer to, or may be performed by, a text encoder as described with reference to FIGS. 7 and 10.

In some embodiments, the precision-encoded mask pyramid encodes the shape and the precision information. Semantic information is encoded to obtain a text feature pyramid. Each level of the text feature pyramid is a $2^l \times 2^l$ text feature map $Z^l$ obtained by combining the masks $M^l$ and the embeddings of the text t. At the 0-th level, the 1×1 masks contain no shape information, and the embeddings of all words are concatenated into a sequence. At the levels where l>0, the embeddings of t are spatially spread over the corresponding masks to jointly represent the shape and semantics.

At operation 1710, the system applies the text features to a text feature map of a set of text feature maps based on a corresponding mask of a set of masks. In some cases, the operations of this step refer to, or may be performed by, a feature pyramid component as described with reference to FIGS. 7, 10, and 11.

In some cases, at levels where l>0, the superscript l is dropped and denote the masks at an arbitrary level as M to construct text feature maps. Each element $M_{i,x,y}$ is a binary value $\in \{0, 1\}$ with overlaps or blank spaces allowed (i.e., $n \geq \Sigma_i^n M_{i,x,y} \geq 0$). Given the initial masks M, the normalized masks $\hat{M}$ are introduced, which are augmented from M by adding an extra mask $M_o$ to indicate the blank space and normalized by the number of shapes at each location. $\hat{M}$ are computed as follows:

$$\hat{M}_{i,x,y} = M_{i,x,y} / \sum_{i=0}^{n} M_{i,x,y}, \text{ where } M_{0,x,y} = \mathbb{1}_{\Sigma_{i=1}^n M_{i,x,y}=0}. \quad (3)$$

In the normalized masks $\hat{M}$, each element $\hat{M}_{i,x,y}$ is a continuous value $\in [0, 1]$ and $\Sigma_{i=0}^n \hat{M}_{i,x,y} = 1$. Each element $Z_{x,y}$ at location x, y is computed as follows:

$$Z_{x,y} = \sum_{i=0}^{n} f(t_i) \cdot \hat{M}_{i,x,y}, \quad (4)$$

where $f(t_i)$ is an embedding of the text $t_i$. $t_0$ is set to be a null token $\emptyset$ to represent unspecified areas, i.e., the blank space indicated by $M_0$.

In some embodiments, the text feature map representation is of the same dimension regardless of the number of masks and compatible with deep convolutional neural network architectures (as known as CNN or ConvNet). Each element of a text feature map is a convex combination of n text embeddings in the learned embedding space. Therefore, some embodiments of the present disclosure achieve decent generalization capability for unseen combinations of concepts. For example, in a text feature map, any overlapping area contains an interpolation of multiple embeddings. Accordingly, creative results are derived from hybrid concepts by drawing overlapping shapes.

At operation 1715, the system generates a text feature pyramid based on the text prompt, the layout information, and the precision level, where the text feature pyramid includes a set of text feature maps at a set of scales, respectively. In some cases, the operations of this step refer to, or may be performed by, a feature pyramid component as described with reference to FIGS. 7, 10, and 11.

In segmentation-to-image, a C-channel one-hot label map is encoded based on a layout containing at most C classes. Such a one-hot label map resembles a special case of text feature maps when the masks are dense and non-overlapping, and the embedding model f is a one-hot encoding function. To compute a one-hot label map, let M be the segmentation masks, t the class labels where $t_i=1, 2, \ldots, C$, $f_c(t_i) = \mathbb{1}_{t_i=c}$. Since M are dense and non-overlapping, the normalized masks $\hat{M}_i$ are the same as $M_i$ for i>1 and $\hat{M}_0=0$. Eq. (4) above then becomes:

$$Z_{c,x,y} = \sum_{i=1}^{n} \mathbb{1}_{t_i=c} \cdot M_{i,x,y} = \sum_{i|t_i=c} M_{i,x,y}. \quad (5)$$

Therefore, the c-th channel of Z is a mask covering pixels of class c, i.e., a one-hot label map. In some cases, the one-hot label map is referred to as one-hot representation and $f(t_i)$ is binary. In some embodiments of the present disclosure, the text feature map representation uses a learned language model as f to encode more informative open-domain layouts.

Figure 18:
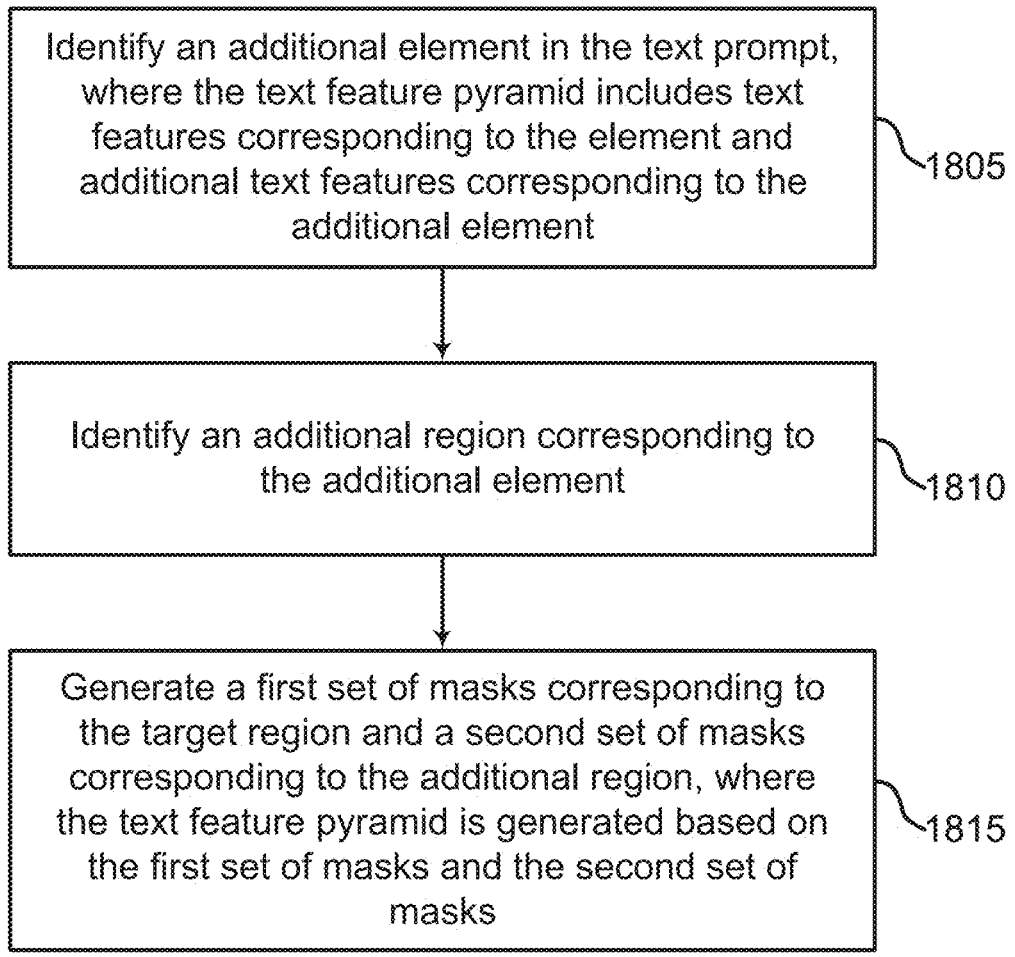
FIG. 18 shows an example of a method for generating masks for corresponding target regions according to aspects of the present disclosure.

FIG. 18 shows an example of a method 1800 for generating masks for corresponding target regions according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1805, the system identifies an additional element in the text prompt, where the text feature pyramid includes text features corresponding to the element and additional text features corresponding to the additional element. In some cases, the operations of this step refer to, or may be performed by, a feature pyramid component as described with reference to FIGS. 7, 10, and 11.

In some embodiments, the machine learning model obtains a text prompt describing an additional element. For example, a user provides a text prompt indicating an additional element (e.g., "oil painting") with no corresponding layout information indicating a target region for the additional element. In some examples, a text prompt describing an additional element is associated with a user-specified precision level of 0. In some examples, a named entity recognition component identifies a set of entities in the text prompt including the additional element. In some examples, the named entity recognition component identifies one or more entities in an additional text prompt.

At operation 1810, the system identifies an additional region corresponding to the additional element. In some cases, the operations of this step refer to, or may be performed by, a mask pyramid component as described with reference to FIGS. 7, 10, and 11.

In some embodiments, the mask pyramid component of the image processing apparatus generates a precision-encoded mask pyramid to model layout precision. In some cases, the precision level of the additional element is 0. Therefore, the mask pyramid component generates a precision-encoded mask for the additional element at the 0-level of the mask pyramid. In some embodiments, the 1×1 masks of the 0-th level of the mask pyramid contain no shape information.

At operation 1815, the system generates a first set of masks corresponding to the target region and a second set of masks corresponding to the additional region, where the text feature pyramid is generated based on the first set of masks and the second set of masks. In some cases, the operations of this step refer to, or may be performed by, a mask pyramid component as described with reference to FIGS. 7, 10, and 11.

In some embodiments, mask pyramid component generates a second set of masks corresponding to the additional region to be the 0-th level text feature map $Z^0$ of the text feature pyramid. In some embodiments, at the 0-th level of the text feature pyramid, the 1×1 masks contain no shape information, and the embeddings of all words are concatenated into a sequence. To compute a text feature pyramid, the unspecified regions are the embedding of a null token $f(\emptyset)$. In some cases, dropout with probability 0.1 is further applied to $Z^0$ by setting $Z^0=f(\emptyset)$. In some cases, the 0-th level text feature maps are obtained directly from the image caption embeddings.

In some embodiment, a diffusion model is applied to generate images from a text feature pyramid. The 0-level text feature maps $Z^0$ are passed through blocks of the U-Net using cross-modal attention and channel-wise feature modulation.

Training and Evaluation

Figure 19:
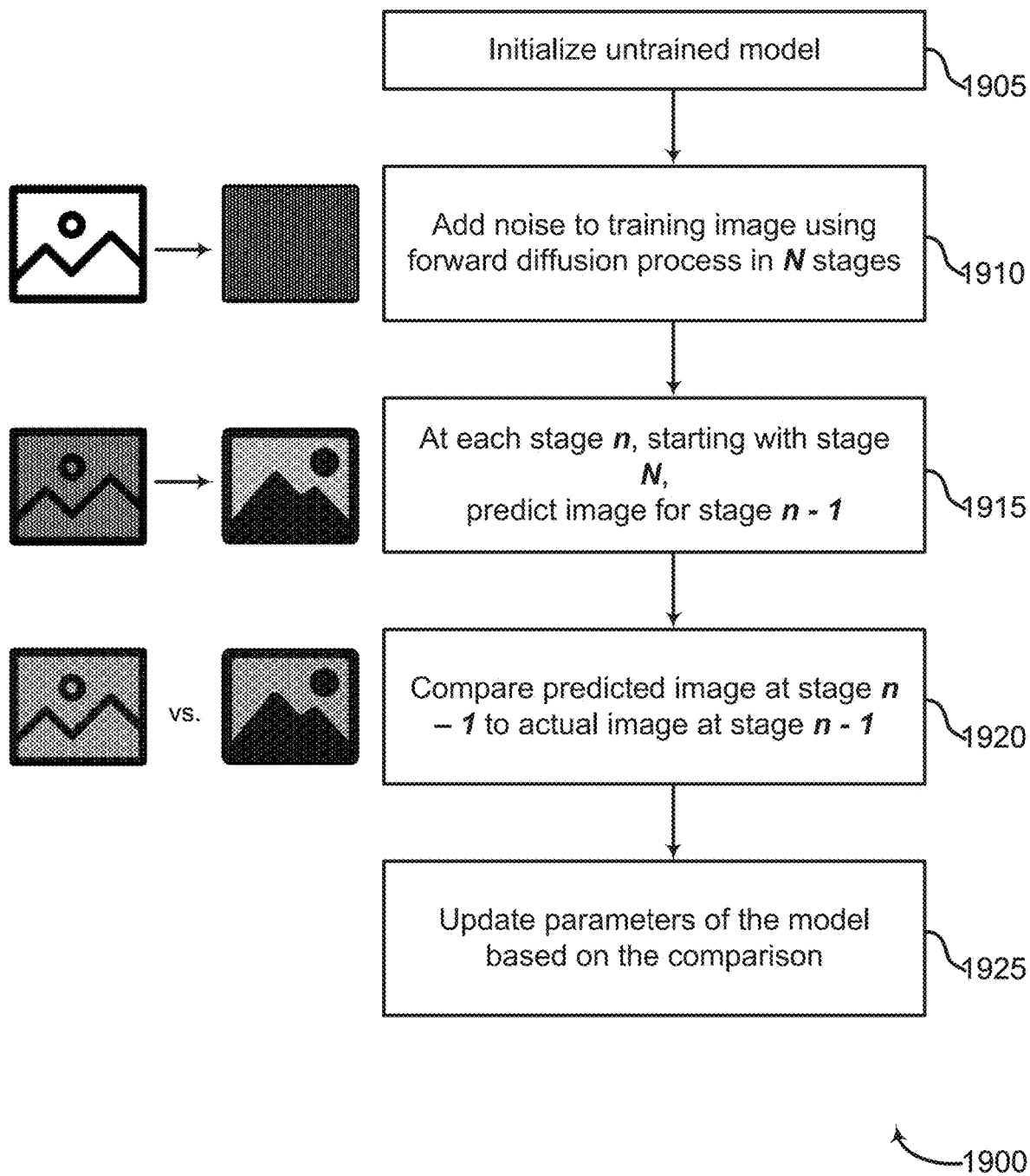
FIG. 19 shows an example of a method for training a diffusion model according to aspects of the present disclosure.
Figure 20:
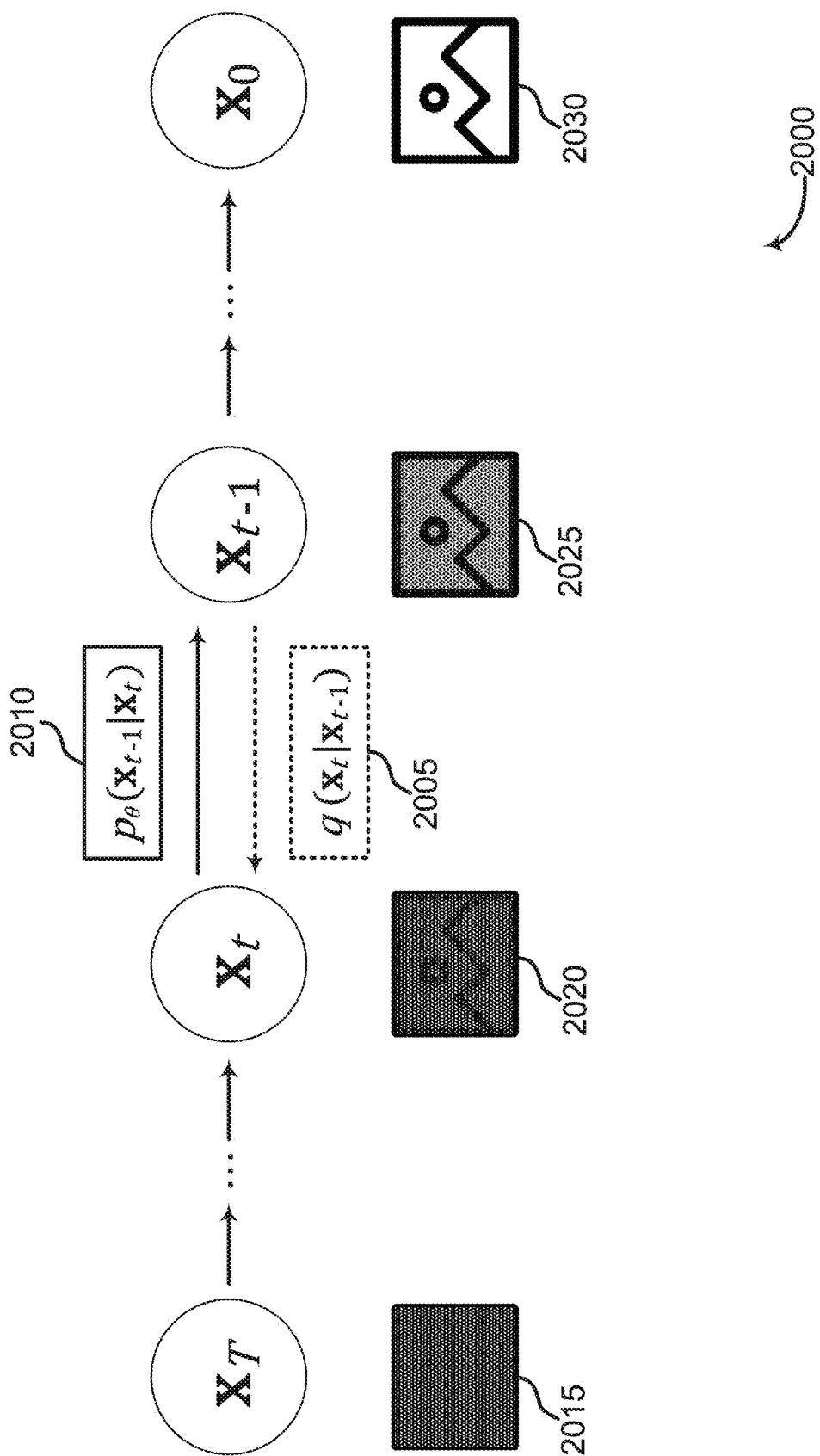
FIG. 20 shows an example of reverse diffusion process according to aspects of the present disclosure.
Figure 21:
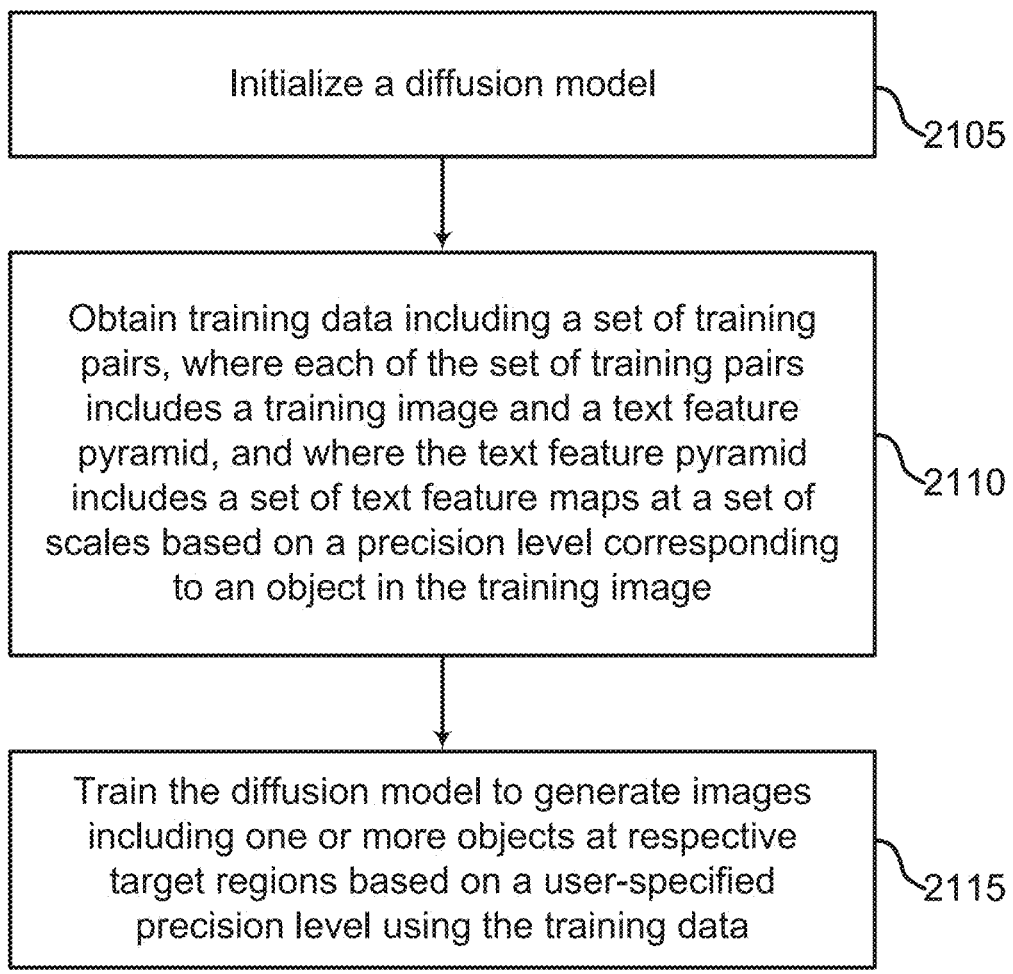
FIG. 21 shows an example of a method for training a diffusion model according to aspects of the present disclosure.

In FIGS. 19-21, a method, apparatus, and non-transitory computer readable medium for image processing are described. One or more embodiments of the method, apparatus, and non-transitory computer readable medium include initializing a diffusion model; obtaining training data including a plurality of training pairs, wherein each of the plurality of training pairs includes a training image and a text feature pyramid, and wherein the text feature pyramid comprises a plurality of text feature maps at a plurality of scales based on a precision level corresponding to an object in the training image; and training the diffusion model to generate images including one or more objects at respective target regions based on a user-specified precision level using the training data.

Some examples of the method, apparatus, and non-transitory computer readable medium further include identifying a label for the object in the training image. Some examples further include encoding the label to obtain text features for the object, wherein the text feature pyramid is based on the text features.

Some examples of the method, apparatus, and non-transitory computer readable medium further include segmenting the training image to obtain a mask corresponding to the object. Some examples further include resizing the mask based on the plurality of scales to obtain a plurality of masks, wherein the text feature pyramid is generated based on the plurality of masks.

Some examples of the method, apparatus, and non-transitory computer readable medium further include computing a diffusion loss function. Some examples further include updating parameters of the diffusion model based on the diffusion loss function.

FIG. 19 shows an example of a method 1900 for training a diffusion model via forward and reverse diffusion according to aspects of the present disclosure. The method 1900 represents an example of training a reverse diffusion process as described above with reference to FIGS. 8 and 20. In some examples, these operations are performed by a system including a processor executing a set of codes to control functional elements of an apparatus, such as the image processing apparatus 700 described in FIG. 7.

Additionally or alternatively, certain processes of method 1900 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1905, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1910, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1915, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1920, the system compares predicted image (or image features) at stage n−1 to an actual image (or image features), such as the image at stage n−1 or the original input image. For example, given observed data x, the diffusion model may be trained to minimize the variational upper bound of the negative log-likelihood−log $p_\theta(x)$ of the training data.

At operation 1925, the system updates parameters of the model based on the comparison. For example, parameters of a U-Net may be updated using gradient descent. Time-dependent parameters of the Gaussian transitions can also be learned.

FIG. 20 shows an example of reverse diffusion process according to aspects of the present disclosure. The example shown includes diffusion process 2000, forward diffusion process 2005, reverse diffusion process 2010, noisy image 2015, first intermediate image 2020, second intermediate image 2025, and original image 2030. FIG. 20 shows a diffusion process 2000. As described above with reference to FIGS. 8 and 19, a diffusion model can include both a forward diffusion process 2005 for adding noise to an image (or features in a latent space) and a reverse diffusion process 2010 for denoising the images (or features) to obtain a denoised image. The forward diffusion process 2005 can be represented as $q(x_t|x_{t-1})$, and the reverse diffusion process 2010 can be represented as $p(x_{t-1}|x_t)$. In some cases, the forward diffusion process 2005 is used during training to generate images with successively greater noise, and a neural network is trained to perform the reverse diffusion process 2010 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 2010, the model begins with noisy data $x_T$, such as a noisy image 2015 and denoises the data to obtain the $p(x_{t-1}|x_t)$. At each step t−1, the reverse diffusion process 2010 takes $x_t$, such as first intermediate image 2020, and t as input. Here, t represents a step in the sequence of transitions associated with different noise levels, The reverse diffusion process 2010 outputs $x_{t-1}$, such as second intermediate image 2025 iteratively until $x_T$ is reverted back to $x_0$, the original image 2030. The reverse process can be represented as:

$$p_\theta(x_{t-1}|x_t) := N\left(x_{t-1}; \mu_\theta(x_t, t), \sum\nolimits_\theta(x_t, t)\right). \quad (6)$$

The joint probability of a sequence of samples in the Markov chain can be written as a product of conditionals and the marginal probability:

$$x_T : p_\theta(x_{0:T}) := p(x_T) \prod\nolimits_{t=1}^T p_\theta(x_{t-1}|x_t), \quad (7)$$

where $p(x_T)=N(x_T; 0, I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input, and a generated data x̃ is mapped back into the pixel space from the latent space as output. In some examples, $x_0$ represents an original input image with low image quality, latent variables $x_1, \ldots, x_T$ represent noisy images, and x represents the generated image with high image quality.

Forward diffusion process 2005 is an example of, or includes aspects of, the corresponding element described with reference to FIG. 8. Reverse diffusion process 2010 is an example of, or includes aspects of, the corresponding element described with reference to FIG. 8. Original image 2030 is an example of, or includes aspects of, the corresponding element described with reference to FIG. 8.

FIG. 21 shows an example of a method 2100 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2105, the system initializes a diffusion model. In some cases, the operations of this step refer to, or may be performed by, a training component as described with reference to FIG. 7.

At operation 2110, the system obtains training data including a set of training pairs, where each of the set of training pairs includes a training image and a text feature pyramid, and where the text feature pyramid includes a set of text feature maps at a set of scales based on a precision level corresponding to an object in the training image. In some cases, the operations of this step refer to, or may be performed by, a training component as described with reference to FIG. 7.

According to some embodiments of the present disclosure, the machine learning model is trained to perform tasks of conditional image synthesis from input semantic layouts of any precision levels. During training, the segmentation masks and text descriptions are generated automatically using text-based object detection and segmentation. The regions where no objects are detected are set as blank space and are assigned a null token Ø. A CLIP model is used to encode the text descriptions to generate CLIP embeddings. In addition, the 0-th level feature maps are obtained from the image caption embeddings. During inference, the segmentation masks and text descriptions are obtained from users. CLIP (Contrastive Language-Image Pre-Training) model is a neural network trained on a variety of image-text pairs.

At operation 2115, the system trains the diffusion model to generate images including one or more objects at respective target regions based on a user-specified precision level using the training data. In some cases, the operations of this step refer to, or may be performed by, a training component as described with reference to FIG. 7.

In some embodiments, the multi-scale guided (feature map conditioned) diffusion model is trained, by a training component, to generate 64×64 images from a layout of precision up to $\log_2 64$. Images are generated at higher resolution by training another diffusion model to upsample 64→256. Additionally, images are generated at higher resolution by generating a latent map at 64×64 resolution and decoding the latent map into a 512×512 image. Some embodiments generalize to both pixel-space and latent-space diffusion strategies by adopting above mentioned methods to generate images at higher resolution. Smaller pixel-space diffusion models are used for ablation studies, and main results are reported based on a larger latent-space diffusion model. In some embodiments, the text encoder encodes the text descriptions using a pre-trained CLIP ViT-L14 language model. To avoid repeated forward passes, the union of all regional descriptions $\cup_i t_i$ are input to the pre-trained CLIP model as a sentence. Then, the text encoder is configured to average the hidden states corresponding to each word in $t_i$ to use as its embedding $f(t_i)$ of each word.

In some embodiments, the aesthetic subset of Laion2Ben dataset is used for training the machine learning model. Full text feature pyramids for 5M randomly selected samples are generated. Regarding the remaining samples, only the 0-th level feature maps are generated. The training component trains a base model of 300M parameters and a super-resolution model of 300M parameters for the pixel space diffusion. The training component trains a base model of 900M parameters and a pre-trained decoder is used for the latent space diffusion. A batch size of 2048 is used for 64×64 models and a batch size of 960 is used for the super-resolution model.

Figure 22:
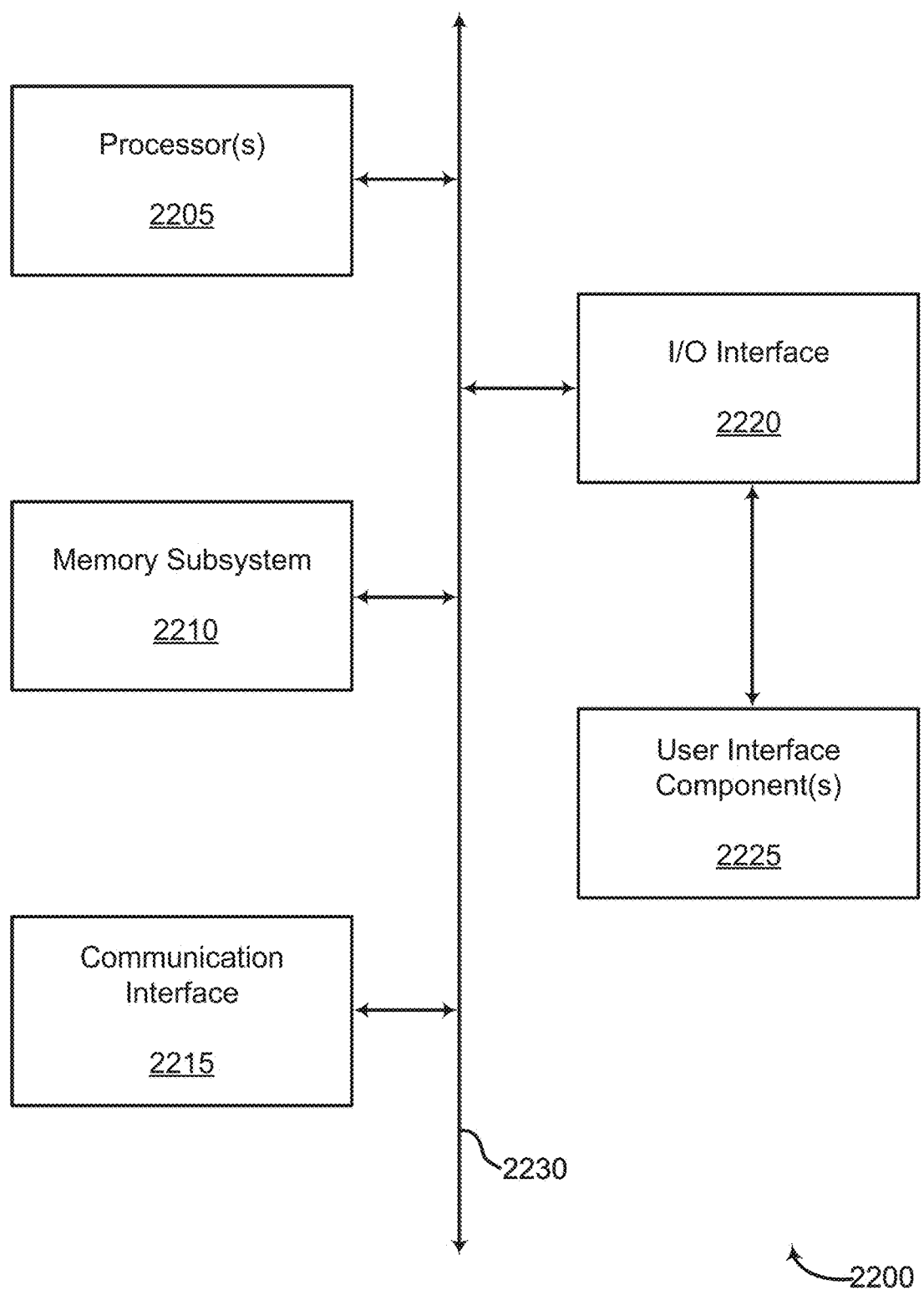
FIG. 22 shows an example of a computing device according to aspects of the present disclosure.

FIG. 22 shows an example of a computing device 2200 according to aspects of the present disclosure. The example shown includes computing device 2200, processor(s) 2205, memory subsystem 2210, communication interface 2215, I/O interface 2220, user interface component(s) 2225, and channel 2230. In one embodiment, computing device 2200 includes processor(s) 2205, memory subsystem 2210, communication interface 2215, I/O interface 2220, user interface component(s) 2225, and channel 2230.

In some embodiments, computing device 2200 is an example of, or includes aspects of, image processing apparatus 110 of FIG. 1. In some embodiments, computing device 2200 includes one or more processors 2205 that can execute instructions stored in memory subsystem 2210 to obtain a text prompt describing an element, layout information indicating a target region for the element, and a precision level corresponding to the element; generate a text feature pyramid based on the text prompt, the layout information, and the precision level, wherein the text feature pyramid comprises a plurality of text feature maps at a plurality of scales, respectively; generate an image based on the text feature pyramid using a diffusion model, wherein the image includes an object corresponding to the element of the text prompt at the target region, wherein a shape of the object corresponds to a shape of the target region based on the precision level.

According to some embodiments, computing device 2200 includes one or more processors 2205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 2210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 2215 operates at a boundary between communicating entities (such as computing device 2200, one or more user devices, a cloud, and one or more databases) and channel 2230 and can record and process communications. In some cases, communication interface 2215 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 2220 is controlled by an I/O controller to manage input and output signals for computing device 2200. In some cases, I/O interface 2220 manages peripherals not integrated into computing device 2200. In some cases, I/O interface 2220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 2220 or via hardware components controlled by the I/O controller.

According to some embodiments, user interface component(s) 2225 enable a user to interact with computing device 2200. In some cases, user interface component(s) 2225 include an audio device, such as an external speaker system, an external display device such as a display screen, an input device (e.g., a remote control device interfaced with a user interface directly or through the I/O controller), or a combination thereof. In some cases, user interface component(s) 2225 include a GUI.

Performance of apparatus, systems and methods of the present disclosure have been evaluated, and results indicate embodiments of the present disclosure have obtained increased performance over existing technology. Example experiments demonstrate that the image processing apparatus outperforms conventional systems.

Example experiments are conducted and reported with regards to image synthesis from any-level semantic layouts using the machine learning model based on the present disclosure. Systems and methods are evaluated on user-drawn coarse layouts and automatically simulated layout data. The machine learning model is evaluated for test-to-image and segmentation-to-image, and its performance is compared to baseline methods.

In some example experiments, a COCO validation set is used for evaluation in the test-to-image setting, while the COCO-stuff validation set is used for segmentation-to-image evaluation. A test set called OpenLayout is constructed for evaluation in open-domain layout-to-image generation. The OpenLayout contains 260 user-drawn layouts of coarse shapes. These layouts are annotated by 10 users based on text prompts randomly sampled from PartiPrompts. In some examples, pseudo layouts are used to evaluate the effect of precision level control. These pseudo layouts include accurate shapes extracted from 5,000 images with caption annotations from the COCO validation set (OpenLayout-COCO).

For quantitative evaluation, CLIP score is computed using the original captions to measure global semantic alignment. To measure spatial alignment, a spatial similarity score (SS score) is defined, which is the cosine similarity between the text feature maps of the input layout and the layout reconstructed from the generated image. For OpenLayout-COCO, as the ground-truth images are available, the FID is computed to measure the visual quality.

Quantitative evaluation results on images generated with different precision levels are recorded. It is shown that using a higher precision level generally leads to a higher spatial similarity, which demonstrates the effectiveness of precision control. On OpenLayout-COCO, the spatial similarity consistently increases as the precision level becomes higher. On OpenLayout, it stays the same at higher levels. This is due to the difference in the inherent layout precision exhibited by the two datasets; compared to OpenLayout-COCO, the layouts in OpenLayout are coarser. For a coarse layout, the generated images already match it well at low precision levels.

It is shown that the results with a lower precision level have a smaller FID, which indicates a similar distribution with respect to the ground-truth images. This is because a lower precision level enforces smaller constraints on the generation process, and therefore the generated images better capture the real image distribution. Similarly, a lower precision level also yields a better CLIP score due to the smaller spatial constraints.

In some embodiments, the image processing apparatus is configured for text-to-image generation by using texts as 0-th layouts. It is shown that the images generated from text prompts based on the present disclosure are visually peasant images with reasonable layouts from just text input. The FID evaluated on the COCO validation set is recorded. The classifier-free guidance scale is set to 3. Some examples sample 30K images using randomly selected text prompts and compute FID against the entire validation set. The systems and methods of the present disclosure achieve increased performance compared to conventional text-to-image generation models.

By combining a named entity recognition model, some embodiments perform layout controllable text-to-image generation. Given an input sentence, the image processing apparatus parses the noun phrases using NER to generate regional text descriptions, and users can arbitrarily draw the shapes for those noun phrases. Example experiments show that generated images match the text well and follow the provided layouts.

In some embodiments, the image processing apparatus generates images from a dense segmentation map of closed-set labels, i.e., following the original segmentation-to-image setting. Some examples treat the class labels as text descriptions and use the highest precision level $c=5$ for all masks. The images generated by the machine learning model based on the present disclosure are of significantly better visual quality. Quantitative comparison results are conducted on the COCO-stuff validation set compared to conventional segmentation-to-image methods. Since the highest resolution of the input layout is 64, the segmentation-to-image results evaluate at 64×64 resolution. The machine learning model achieves lower FID and comparable mIOU. After being fine-tuned on the COCO-stuff training set, the machine learning model outperforms existing models in terms of both FID and mIOU.

In some ablation experiments, methods and systems of the present disclosure are compared to two fixed-level baseline models (i.e., a text-to-image generation model and a fixed-level layout-to-image generation model). The baseline models are of the same architecture as the machine learning model (e.g., any-level model) described in the present disclosure. When training the baseline models, layouts of fixed levels are used, i.e., the 0-th level for the text-to-image baseline and the 4-th level for the fixed-level segmentation-to-image baseline. Evaluation results of the any-level model and fixed-level baselines at the corresponding levels are recorded. The machine learning model (e.g., any-level model) achieves better results than the baseline models.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a text prompt describing an element, layout information indicating a target region for the element, and a precision level corresponding to the element;
generating a text feature pyramid based on the text prompt, the layout information, and the precision level, wherein the text feature pyramid comprises a plurality of text feature maps at a plurality of scales, respectively; and
generating an image based on the text feature pyramid using a diffusion model, wherein the image includes an object corresponding to the element of the text prompt at the target region, wherein a shape of the object corresponds to a shape of the target region based on the precision level.

2. The method of claim 1, wherein generating the text feature pyramid comprises:
encoding the text prompt to obtain text features representing the element of the text prompt, wherein the text feature pyramid includes the text features.

3. The method of claim 2, wherein generating the text feature pyramid further comprises:
applying the text features to a text feature map of the plurality of text feature maps based on a corresponding mask of a plurality of masks.

4. The method of claim 1, wherein generating the text feature pyramid comprises:
generating a plurality of masks for the element at a plurality of resolutions, respectively, wherein a relationship between the target region and each of the plurality of masks is based on the precision level.

5. The method of claim 4, wherein generating the text feature pyramid further comprises:
determining that a mask index is less than or equal to the precision level; and
generating a non-zero mask of the plurality of masks corresponding to the target region based on the determination.

6. The method of claim 4, wherein generating the text feature pyramid further comprises:
generating an initial mask corresponding to the target region; and
resizing the initial mask to obtain the plurality of masks at the plurality of resolutions.

7. The method of claim 1, wherein generating the text feature pyramid comprises:
identifying an additional element in the text prompt, wherein the text feature pyramid includes text features corresponding to the element and additional text features corresponding to the additional element.

8. The method of claim 7, wherein generating the text feature pyramid further comprises:
identifying an additional region corresponding to the additional element; and
generating a first plurality of masks corresponding to the target region and a second plurality of masks corresponding to the additional region, wherein the text feature pyramid is generated based on the first plurality of masks and the second plurality of masks.

9. The method of claim 1, wherein generating the image comprises:
providing the plurality of text feature maps to a plurality of layers of the diffusion model based on the plurality of scales, respectively.

10. The method of claim 1, further comprising:
displaying a user interface, wherein the user interface includes a text input field for the text prompt and a selection tool for selecting the target region.

11. A method comprising:
initializing a diffusion model;
obtaining training data including a plurality of training pairs, wherein each of the plurality of training pairs includes a training image and a text feature pyramid, and wherein the text feature pyramid comprises a plurality of text feature maps at a plurality of scales based on a precision level corresponding to an object in the training image; and
training the diffusion model to generate images including one or more objects at respective target regions based on a user-specified precision level using the training data, wherein the training comprises computing a diffusion loss based on the text feature pyramid and updating parameters of the diffusion model based on the diffusion loss.

12. The method of claim 11, wherein obtaining the training data comprises:
identifying a label for the object in the training image; and
encoding the label to obtain text features for the object, wherein the text feature pyramid is based on the text features.

13. The method of claim 11, wherein obtaining the training data comprises:
segmenting the training image to obtain a mask corresponding to the object; and
resizing the mask based on the plurality of scales to obtain a plurality of masks, wherein the text feature pyramid is generated based on the plurality of masks.

14. An apparatus comprising:
at least one processor;
at least one memory including instructions executable by the at least one processor;
a text encoder configured to encode a text prompt to obtain a text prompt embedding representing global information of the text prompt; and a diffusion model comprising parameters stored in the at least one memory, wherein the diffusion model is trained to generate an image based on a text feature pyramid and the text prompt embedding, wherein the image includes an object corresponding to an element of the text prompt at a target region, and wherein a shape of the object corresponds to a shape of the target region based on a user-specified precision level.

15. The apparatus of claim 14, further comprising:
a named entity recognition (NER) component configured to identify a plurality of entities in the text prompt including the element.

16. The apparatus of claim 14, further comprising:
a user interface configured to identify the text prompt describing the element, layout information indicating the target region for the element of the text prompt, and the user-specified precision level corresponding to the element.

17. The apparatus of claim 14, wherein:
the diffusion model comprises a U-net architecture including a plurality of input layers configured to receive input corresponding to each of a plurality of scales of the text feature pyramid, respectively.

18. The apparatus of claim 14, further comprising:
a feature pyramid component configured to generate the text feature pyramid based on the text prompt, layout information indicating the target region for the element of the text prompt, and the user-specified precision level, wherein the text feature pyramid comprises a plurality of text feature maps at a plurality of scales, respectively.

* * * * *